US011860928B2

United States Patent
Guo et al.

(10) Patent No.: US 11,860,928 B2
(45) Date of Patent: *Jan. 2, 2024

(54) DIALOG-BASED IMAGE RETRIEVAL WITH CONTEXTUAL INFORMATION

(71) Applicant: International Business Machines Corporation, Armonk, NY (US)

(72) Inventors: Xiaoxiao Guo, Mountain View, CA (US); Hui Wu, White Plains, NY (US); Rogerio Feris, Hartford, CT (US)

(73) Assignee: International Business Machines Corporation, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/406,893

(22) Filed: Aug. 19, 2021

(65) Prior Publication Data

US 2021/0382922 A1 Dec. 9, 2021

Related U.S. Application Data

(63) Continuation of application No. 16/656,468, filed on Oct. 17, 2019, now Pat. No. 11,100,145.

(Continued)

(51) Int. Cl.
*G06F 16/00* (2019.01)
*G06F 16/53* (2019.01)
(Continued)

(52) U.S. Cl.
CPC .......... *G06F 16/53* (2019.01); *G06F 16/3328* (2019.01); *G06F 16/3329* (2019.01);
(Continued)

(58) Field of Classification Search
CPC .. G06F 16/53; G06F 16/3328; G06F 16/3329; G06F 16/383; G06F 18/2185; G06N 3/049
See application file for complete search history.

(56) References Cited

U.S. PATENT DOCUMENTS 5,696,964 A * 12/1997 Cox .................... G06F 16/5838
707/999.005
6,181,818 B1    1/2001 Sato et al.
(Continued)

FOREIGN PATENT DOCUMENTS

WO    2017096099 A1    6/2017

OTHER PUBLICATIONS

Shuxiong et al., "Semantic R-CNN for Natural Language Object Detection", Advances in Multimedia Information Processing—PCM 2017 (Pacific Rim Conference on Multimedia), Lecture Notes in Computer Science (LNCS) 10736, Sep. 2017, pp. 98-107, https://link.springer.com/chapter/10.1007/978-3-319-77383-4_10.
(Continued)

*Primary Examiner* — William L Bashore
*Assistant Examiner* — David Faber
(74) *Attorney, Agent, or Firm* — Caleb Wilkes; Otterstedt & Kammer PLLC

(57) ABSTRACT

A method includes receiving input from a client at least partially specifying one or more characteristics, wherein the initial input includes a seed image and a natural language statement describing a desired change to the seed image; predicting one or more attributes of the seed image by operation of a neural network on the seed image; and parsing the natural language statement to identify desired changes to the one or more attributes of the seed image. The method also includes generating an interim target image by changing the one or more attributes of the seed image, according to the parsed natural language statement; selecting a set of images from an image database for output to the client, each of said set of images being determined to at least partially satisfy the one or more changed attributes of the seed image; and displaying the set of images to the client.

19 Claims, 11 Drawing Sheets

Related U.S. Application Data

(60) Provisional application No. 62/899,028, filed on Sep. 11, 2019.

(51) Int. Cl.
*G06F 16/332* (2019.01)
*G06F 16/383* (2019.01)
*G06N 3/049* (2023.01)
*G06F 16/535* (2019.01)
*G06F 18/21* (2023.01)
*G06V 10/70* (2022.01)
*G06V 10/82* (2022.01)
*G06V 40/10* (2022.01)

(52) U.S. Cl.
CPC .......... *G06F 16/383* (2019.01); *G06F 16/535* (2019.01); *G06F 18/2185* (2023.01); *G06N 3/049* (2013.01); *G06V 10/768* (2022.01); *G06V 10/82* (2022.01); *G06V 40/103* (2022.01)

(56) References Cited

U.S. PATENT DOCUMENTS

| | | | |
|---|---|---|---|
| 6,606,623 B1 | 8/2003 | Hsieh et al. | |
| 6,859,802 B1* | 2/2005 | Rui | G06V 10/761 707/999.005 |
| 7,089,226 B1 | 8/2006 | Dumais et al. | |
| 7,272,593 B1 | 9/2007 | Castelli et al. | |
| 8,190,604 B2 | 5/2012 | Wen et al. | |
| 9,875,258 B1 | 1/2018 | Hsiao | |
| 10,175,850 B2* | 1/2019 | Smith | G06F 3/0482 |
| 10,353,951 B1 | 7/2019 | Li | |
| 10,503,765 B2* | 12/2019 | Duffy | G06F 16/2455 |
| 10,664,721 B1 | 5/2020 | Price | |
| 10,977,303 B2* | 4/2021 | Wu | G06F 16/951 |
| 2007/0288435 A1* | 12/2007 | Miki | G06F 16/5838 |
| 2008/0123963 A1* | 5/2008 | Harada | G11B 27/28 382/190 |
| 2011/0145068 A1* | 6/2011 | King | G06F 16/435 348/222.1 |
| 2013/0097181 A1* | 4/2013 | Sud | G06F 16/316 707/765 |
| 2014/0081633 A1* | 3/2014 | Badaskar | G06F 16/587 707/723 |
| 2014/0188935 A1* | 7/2014 | Vee | G06F 16/248 707/771 |
| 2015/0149428 A1* | 5/2015 | Smith | G06F 16/9032 707/706 |
| 2015/0161175 A1* | 6/2015 | Yee | G06F 16/532 707/E17.019 |
| 2015/0331908 A1 | 11/2015 | Duffy | |
| 2015/0331929 A1* | 11/2015 | El-Saban | G06F 16/3329 707/739 |
| 2015/0363660 A1* | 12/2015 | Vidal | G06V 10/764 382/173 |
| 2016/0063096 A1* | 3/2016 | Bostick | G06F 16/334 707/728 |
| 2017/0068670 A1 | 3/2017 | Orr et al. | |
| 2017/0147610 A1* | 5/2017 | Barré | G06F 16/5866 |
| 2017/0278135 A1 | 9/2017 | Majumdar et al. | |
| 2017/0300495 A1* | 10/2017 | Sharifi | G06F 16/583 |
| 2018/0012110 A1 | 1/2018 | Souche et al. | |
| 2018/0012386 A1* | 1/2018 | Kemelmaher | G06F 16/58 |
| 2018/0060029 A1* | 3/2018 | Kogan | G06F 3/167 |
| 2018/0108066 A1* | 4/2018 | Kale | G06F 16/24522 |
| 2018/0129742 A1 | 5/2018 | Li et al. | |
| 2019/0147073 A1* | 5/2019 | Bakir | G06F 16/532 382/305 |
| 2019/0163768 A1* | 5/2019 | Gulati | G06F 16/56 |
| 2019/0196698 A1 | 6/2019 | Cohen | |
| 2019/0294702 A1 | 9/2019 | Wu et al. | |
| 2020/0065324 A1* | 2/2020 | Watanabe | G06F 16/532 |
| 2020/0110955 A1* | 4/2020 | Nakagawa | G06F 16/538 |
| 2020/0134056 A1* | 4/2020 | Sarkar | G06F 16/56 |
| 2020/0302229 A1* | 9/2020 | Kim | G06V 10/774 |
| 2020/0320351 A1* | 10/2020 | Nikolenko | G06F 18/217 |
| 2020/0394447 A1* | 12/2020 | Chae | G06F 16/55 |
| 2020/0401616 A1* | 12/2020 | Tsuji | G06F 16/538 |
| 2021/0073252 A1 | 3/2021 | Guo | |

OTHER PUBLICATIONS

Kovashka et al., "WhittleSearch: Image Search with Relative Attribute Feedback", 2012 IEEE Conference on Computer Vision and Pattern Recognition, Jun. 2012, pp. 2973-2980, https://ieeexplore.ieee.org/abstract/document/6248026.

Kovashka et al., "WhittleSearch: Interactive Image Search with Relative Attribute Feedback", International Journal of Computer Vision, v. 115, n. 2, Nov. 2015, pp. 185-210, https://link.springer.com/article/10.1007/s11263-015-0814-0.

Wen et al., "A Network-based End-to-End Trainable Task-oriented Dialogue System", Proceedings of the 15th Conference of the European Chapter of the Association for Computational Linguistics, v. 1, Apr. 2017, pp. 438-449, https://aclweb.org/anthology/E17-1042.

Dhingra et al., "Towards End-to-End Reinforcement Learning of Dialogue Agents for Information Access", Proceedings of the 55th Annual Meeting of the Association for Computational Linguistics, Jul.- Aug. 2017, pp. 484-495, https://www. aclweb.org/anthology/P17-1045.

Shen et al., "Active Feedback in Ad Hoc Information Retrieval", Proceedings of the 28th annual international ACM SIGIR conference on Research and development in information retrieval, Aug. 2005, pp. 59-66, https://dl.acm.org/citation.cfm?id=1076047.

Loisel et al., "A conversational agent for information retrieval based on a study of human dialogues", Proceedings of the 4th International Conference on Agent and Artificial Intelligence (ICAART-2012), Feb. 2012, pp. 312-317, https://www.scitepress.org/PublicationsDetail.aspx?ID=2uxkL8cWvZ1%3d&t=1.

Vo et al., "Composing Text and Image for Image Retrieval", 2019 IEEE Conference on Computer Vision and Pattern Recognition (CVPR), Jun. 2019, pp. 6439-6448, http://openaccess.thecvf.com/content_CVPR_2019/papers/Vo_Composing_Text_and_Image_for_Image_Retrieval_-_an_Empirical_CVPR_2019_paper.pdf.

Guo et al., "The Fashion IQ Dataset: Retrieving Images by Combining Side Information and Relative Natural Language Feedback", May 30, 2019, 14 pages, https://arxiv.org/pdf/1905.12794v1.pdf.

Guo et al., "Dialog-based Interactive Image Retrieval", 32nd Conference on Neural Information Processing Systems (NeurIPS 2018), Dec. 2018, 17 pages, http://papers.nips.cc/paper/7348-dialog-based-interactive-image-retrieval.

Kingma et al., "Adam: A Method for Stochastic Optimization", 3rd International Conference for Learning Representations (ICLR), May 2015, 13 pages, https://arxiv.org/pdf/1412.6980v5.pdf.

Liu et al., "DeepFashion: Powering Robust Clothes Recognition and Retrieval with Rich Annotations", 2016 IEEE Conference on Computer Vision and Pattern Recognition (CVPR), Jun. 2016, pp. 1096-1104, https://www.cv-foundation.org/openaccess/content_cvpr_2016/papers/Liu_DeepFashion_Powering_Robust_CVPR_2016_paper.pdf.

He et al., "Deep Residual Learning for Image Recognition", 2016 IEEE Conference on Computer Vision and Pattern Recognition (CVPR), Jun. 2016, pp. 770-778, https://www.cv-foundation.org/openaccess/content_cvpr_2016/papers/He_Deep Residual_Learning_CVPR_2016_paper.pdf.

Yoon Kim, "Convolutional Neural Networks for Sentence Classification", Proceedings of the 2014 Conference on Empirical Methods in Natural Language Processing (EMNLP), Oct. 2014, pp. 1746-1751, https://www.aclweb.org/anthology/D14-1181.

Xu et al., "Show, Attend, and Tell: Show, Attend and Tell: Neural Image Caption Generation with Visual Attention", Proceedings of the 32nd International Conference on Machine Learning (ICML), Proceedings of Machine Learning Research (PMLR), v. 37, Jul. 2015, pp. 2048-2057, http://proceedings.mlr.press/v37/xuc15.pdf.

(56) References Cited

OTHER PUBLICATIONS

Kiros et al., "Unifying Visual-Semantic Embeddings with Multimodal Neural Language Models", Nov. 2014, 13 pages, https://arxiv.org/pdf/1411.2539v1.pdf.

Shuxiong et al., Semantic R-CNN for Natural Language Object Detection, Pacific Rim Conference on Multimedia, Advances in Multimedia Information Processing—PCM 2017, (conference paper, first available online May 10, 2018) as Part of the Lecture Notes in Computer Science book series (LNCS, vol. 10736), pp. 98-107, presented Harbin, China, Sep. 28-29, 2017.

Kovashka, et al., Whittlesearch: Image search with relative attribute feedback, 2012 IEEE Conference on Computer Vision and Pattern Recognition, IEEE, 2012, 8 pages.

Wen et al., A network-based end-to-end trainable task-oriented dialogue system, arXiv preprint arXiv:1604.04562 (2016), 12 pages.

Dhingra, et al., Towards end-to-end reinforcement learning of dialogue agents for information access, arXiv preprint arXiv:1609.00777 (2016), 12 pages.

Shen, et al., Active feedback in ad hoc information retrieval, Proceedings of the 28th annual international ACM SIGIR conference on Research and development in information retrieval. ACM, 2005, 8 pages.

Loisel, et al., A conversational agent for information retrieval based on a study of human dialogues. In International Conference on Agent and Artificial Intelligence, 2012, pp. 312-317.

Guo et al. Dialog-based Interactive Image Retrieval, 32nd Conference on Neural Information Processing Systems (NeurIPS 2018), 11 pages, 2018.

Anonymous ICCV submission, The Fashion IQ Dataset: Retrieving Images by Combining Side Information and Relative Natural Language Feedback, Paper ID 6196, ICCV 2019 Submission #6196, 10 pages, 2019.

Anonymous ICCV submission, Supplemental Materials, The Fashion IQ Dataset: Retrieving Images by Combining Side Information and Relative Natural Language Feedback, Paper ID 6196, ICCV 2019 Submission #6196, 3 pages, 2019.

* cited by examiner

100

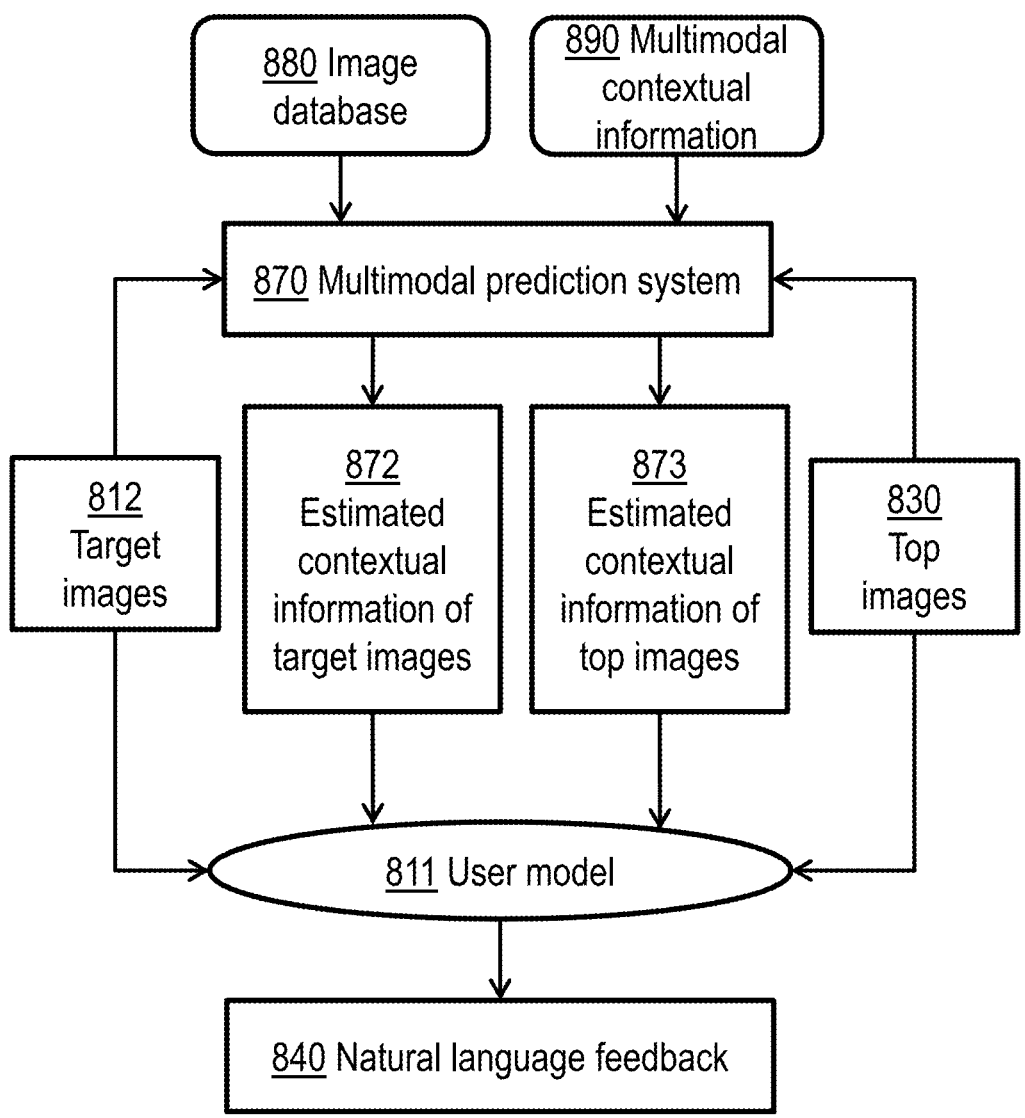

FIG. 10

|  | Dresses | | Tops&Tees | | Shirts | |
|---|---|---|---|---|---|---|
|  | train / val / test | total | train / val / test | total | train / val / test | total |
| # Images | 11452 / 3817 / 3818 | 19087 | 16121 / 5374 / 5374 | 26869 | 19036 / 6346 / 6346 | 31728 |
| # Images with side info | 7741 / 2561 / 2653 | 12955 | 9925 / 3303 / 3210 | 16438 | 12062 / 4014 / 3995 | 20071 |
| # Relative Captions | 11970 / 4034 / 4048 | 20052 | 12054 / 3924 / 4112 | 20090 | 11976 / 4076 / 4078 | 20130 |

FIG. 11

|  | Dresses | | Shirts | | Tops&Tees | |
|---|---|---|---|---|---|---|
|  | top-3 | top-5 | top-3 | top-5 | top-3 | top-5 |
| Texture | 0.50 | 0.60 | 0.69 | 0.78 | 0.54 | 0.65 |
| Fabric | 0.45 | 0.53 | 0.70 | 0.76 | 0.52 | 0.58 |
| Shape | 0.36 | 0.47 | 0.69 | 0.78 | 0.51 | 0.61 |
| Part | 0.31 | 0.44 | 0.51 | 0.66 | 0.37 | 0.49 |
| Style | 0.19 | 0.28 | 0.26 | 0.36 | 0.21 | 0.28 |
| All | 0.36 | 0.46 | 0.57 | 0.66 | 0.43 | 0.51 |

FIG. 12

|  |  | BLEU-1 | BLEU-2 | BLEU-3 | BLEU-4 | Meteor | Rouge-L | CIDEr | SPICE |
|---|---|---|---|---|---|---|---|---|---|
| Attribute-aware | (D) | 61.3 | 44.1 | 29.0 | 19.7 | 26.2 | 55.5 | 59.4 | 34.7 |
| with Attention | (S) | 57.7 | 46.3 | 32.9 | 22.3 | 27.9 | 57.1 | 78.8 | 36.6 |
| 1210 | (T) | 58.4 | 44.1 | 29.6 | 20.3 | 26.5 | 54.1 | 63.3 | 35.3 |
| - Drop Attribute | (D) | 60.3 | 43.5 | 28.8 | 19.0 | 25.9 | 54.7 | 58.5 | 35.8 |
|  | (S) | 56.0 | 45.4 | 31.6 | 19.8 | 25.9 | 54.7 | 58.5 | 33.8 |
| 1211 | (T) | 57.3 | 43.2 | 28.9 | 19.7 | 26.2 | 53.6 | 62.4 | 34.7 |
| - Image | (D) | 56.6 | 39.9 | 25.0 | 14.5 | 23.8 | 51.2 | 52.8 | 29.4 |
|  | (S) | 48.2 | 39.1 | 24.8 | 16.1 | 23.8 | 51.7 | 50.3 | 31.7 |
| 1212 | (T) | 44.1 | 35.5 | 21.4 | 13.1 | 21.9 | 50.1 | 33.7 | 29.6 |
| Attribute-aware | (D) | 58.5 | 42.0 | 26.7 | 17.5 | 24.0 | 53.2 | 42.7 | 30.8 |
| via Concatenation | (S) | 54.5 | 42.6 | 29.1 | 19.4 | 25.8 | 53.5 | 47.1 | 31.8 |
| 1220 | (T) | 55.9 | 41.0 | 26.0 | 17.0 | 25.4 | 51.5 | 40.7 | 31.1 |
| Image-Only | (D) | 58.1 | 41.0 | 26.3 | 17.4 | 24.8 | 53.6 | 48.9 | 32.1 |
|  | (S) | 53.2 | 41.9 | 29.0 | 19.6 | 25.9 | 53.8 | 52.6 | 32.0 |
| 1230 | (T) | 54.0 | 39.4 | 24.6 | 15.7 | 24.3 | 50.5 | 41.1 | 30.6 |

DIALOG-BASED IMAGE RETRIEVAL WITH CONTEXTUAL INFORMATION

CROSS-REFERENCE TO RELATED APPLICATIONS

This application is a continuation of U.S. patent application Ser. No. 16/656,468 filed Oct. 17, 2019, which in turn claims the benefit of U.S. Provisional Application Ser. No. 62/899,028 filed 11 Sep. 2019. The complete disclosures of U.S. patent application Ser. No. 16/656,468 and U.S. Provisional Application Ser. No. 62/899,028 are hereby expressly incorporated herein by reference in their entireties for all purposes.

STATEMENT REGARDING PRIOR DISCLOSURES BY THE INVENTORS

A paper by Guo et al. entitled "The Fashion IQ Dataset: Retrieving Images by Combining Side Information and Relative Natural Language Feedback", dated May 30, 2019 (hereinafter "Guo19"), which is incorporated by reference herein in its entirety for all purposes, is submitted herewith and cited in an accompanying Information Disclosure Statement (IDS). Each of the named inventors of the present application is named as an author of the Guo19 paper. The authors of the Guo19 paper not named as inventors of the present application contributed to other portions of the Guo19 paper, but the subject matter of Sections 4 and 5 and Appendix B of the Guo19 paper was invented only by the inventors of the present application. The Guo19 paper was not published or otherwise made available to the public more than one year before the filing of the present application.

A paper by Guo et al. entitled "Dialog-based Interactive Image Retrieval," which was presented at the 32nd Conference on Neural Information Processing Systems (NeurIPS 2018) in December 2018 (hereinafter "Guo18"), which is incorporated by reference herein in its entirety for all purposes, is submitted herewith and cited in an accompanying Information Disclosure Statement (IDS). Each of the named inventors of the present application is named as an author of the Guo18 paper. The Guo18 paper was not published or otherwise made available to the public more than one year before the filing of the present application.

U.S. patent application Ser. No. 15/927,309, filed on Mar. 21, 2018, by Wu et al. (hereinafter "Wu"), which is incorporated by reference herein in its entirety for all purposes, is cited in an accompanying Information Disclosure Statement (IDS). Each of the named inventors of the present application is named as an inventor of the Wu application. The present application and the Wu application were, not later than the effective filing date of the present application, commonly owned by International Business Machines Corp.

BACKGROUND

The present invention relates to the electrical, electronic and computer arts, and, more particularly, to improvements in searching and retrieving images.

Interactive image retrieval is used in a variety of domains, including retail, safety/security, healthcare, and fashion/design. Despite decades of research, however, interactive image retrieval, despite decades of research, remains a challenge. At the crux of the challenge are two entangled elements: (1) empowering the user with ways to express what they want, and (2) empowering the retrieval machine with the information, capacity, and learning objective to realize high performance. There is a semantic gap between visual features and high-level semantic concepts which contributes to the difficulty of fully understanding the user's search intent. Thus, it is desirable for an image retrieval system to allow a user to give feedback to the system and help the system to retrieve better results.

Traditional systems have relied on relevance feedback, allowing users to indicate which images are "similar" or "dissimilar" to the desired image. Relative attribute feedback allows the comparison of the desired image with candidate images based on a fixed set of attributes. Thus, most current systems are based on purely text-based relevance questions and answers regarding a single image, and are frequently focused on content-based or attribute-based product search.

More recent work on image retrieval has demonstrated the power of utilizing natural language to address this problem with relative captions describing the differences between a reference image and what the user had in mind. As described by Wu and Guo18, dialog-based interactive retrieval is a principled and general methodology for interactively engaging the user in a conversation to resolve their intent. Here again, however, user interaction is restricted to natural language based information (e.g., a set of attributes) in a single modality. While effective, this restriction on the specific form of user interaction largely constrains the information that a user can convey to retrieve images more effectively.

In real-world applications, images and videos are often associated with side information (e.g., metadata and/or contextual information) which, in the wild, varies greatly in format and information content. Such information may be free to obtain, but often noisy and incomplete. Still, attributes and representations extracted from this data can form a strong basis for generating stronger image captions and more effective image retrieval. Nevertheless, there is a long-felt but unmet need for techniques which leverage side information to interact with and enhance image retrieval systems based on relative natural language feedback.

SUMMARY

An illustrative embodiment includes a method for improved interactive image search. The method includes: receiving initial input from a client at least partially specifying one or more characteristics sought by the client; selecting a set of images from an image database for output to the client, each of said set of images being determined to at least partially satisfy the one or more characteristics specified by the input received from the client; and determining after each set of images whether an end condition has occurred. The method further includes, until the end condition has occurred: responsive to each set of images output to the client, receiving additional input from the client further specifying the one or more characteristics sought by the client; and responsive to each input received from the client, selecting another set of images from the image database for presentation to the client, each of said set of images being determined to at least partially satisfy the one or more characteristics specified by all input received from the client, said determination being based at least in part on side information for respective images for at least the set of images, said side information for at least the set of images being retrieved from a repository storing side information for respective images within the image database.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. Illustrative embodiments of the present invention utilize multimodal contextual information to improve natural language feedback based image retrieval (e.g., dialog-based image retrieval). Illustrative embodiments of the present invention may augment an interactive retrieval system with multimodal contextual information, e.g., by training and utilizing a multimodality contextual information prediction model to denoise and complete multimodal contextual information. Illustrative embodiments of the present invention provide a new framework for dialog based interactive image retrieval that leverages both reconstructed side information and relative natural language feedback to substantially improve state-of-the-art image retrieval performance.

Experimental results discussed herein empirically demonstrate that combining natural language feedback with visual attribute information results in superior user feedback modeling and retrieval performance relative to using either of these modalities alone. Using visual attributes as side information enhances both user feedback modeling through improved relative captioning, and the visual-semantic quality of the image representations utilized by the retriever, which leads to significantly improved retrieval results. Thus, illustrative embodiments of the present invention advantageously incorporate side information to improve both user feedback modeling and dialog-based image retrieval. More particularly, an illustrative embodiment may use visual attributes mined from product descriptions to significantly improve user feedback modeling and interactive image retrieval based on natural language.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 is a combined block/flow diagram depicting an illustrative embodiment of the invention incorporating user modelling;

FIG. 10 shows statistics regarding the data used to obtain the experimental results shown in FIGS. 11-14;

FIG. 11 shows experimental results for an attribute prediction network according to an illustrative embodiment of the invention;

FIG. 12 shows experimental results for a user simulator according to an illustrative embodiment of the invention;

DETAILED DESCRIPTION

Figure 1:
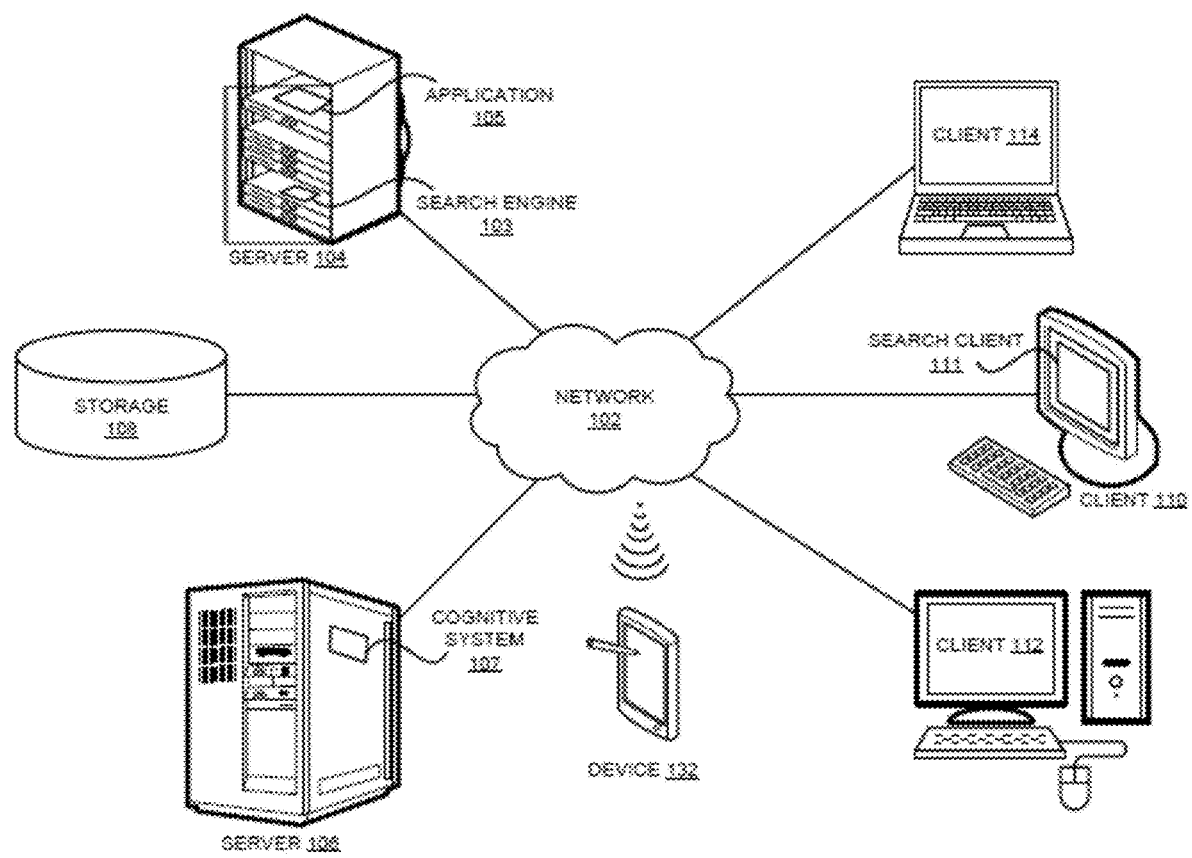
FIG. 1 is a block diagram depicting a network of data processing systems in which illustrative embodiments may be implemented.

Hereinafter, a digital image is interchangeably referred to as simply "images" or "image" unless expressly disambiguated where used. An image generally refers to a digital representation or facsimile of a physical object or a collection of physical objects. Examples of an image may include, for example, a single-frame static image, an animated image, a frame in a video, photographic image, caricature. Images may or may not also include text, either displayed within the image itself (e.g., an image macro) or accompanying the image (e.g., metadata such as a caption). An image feature may include a describable property of an object in an image that is also referenced in an accompanying natural language or keyword input.

A search engine is generally understood to be an application that executes on a computer and is configured to search for information that is available in electronic form. Search engines are presently available for searching local or remote repositories of information, including but not limited to searching using the internet. A search engine may be capable of searching for textual content as well as images.

A natural language (NL) generally refers to a scripted (written) or a vocalized (spoken) language having a form that is employed by humans for primarily communicating with other humans or with systems having a natural language interface. Natural language processing (NLP) is a technique that facilitates exchange of information between humans and data processing systems. NLP may include transforming human readable or human understandable content into machine usable data. NLP may also include answering questions about a subject matter based on information available about the subject matter domain.

A cognitive system generally refers to a data processing system that perform cognitive analysis, and such a system is also referred to as a Question and Answer system (Q and A system). Cognitive analytics generally refers the process of analyzing available information or knowledge to create, infer, deduce, or derive new information. A cognitive system may, for example, perform such an analysis based on natural language inputs using NLP techniques.

The illustrative embodiments are described with respect to certain types of objects, images, image features, inputs, NL inputs, NL responses and interactions, response features, comparisons, confidence, thresholds, tolerances, training, conditions, cognitive configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1, these figures are example diagrams of data processing environments in which illustrative embodiments may be implemented. FIG. 1 is only an example and is not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein and improves the operations of search engine 103 in a manner described herein. For an operation described herein application 105 uses cognitive system 107. The combination of application 105 and cognitive system 107 is trained in a manner described herein. Search client 111 is a client application the is usable to submit user inputs, seed image, and user's NL responses to application 105, and to conduct NL interactions with application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
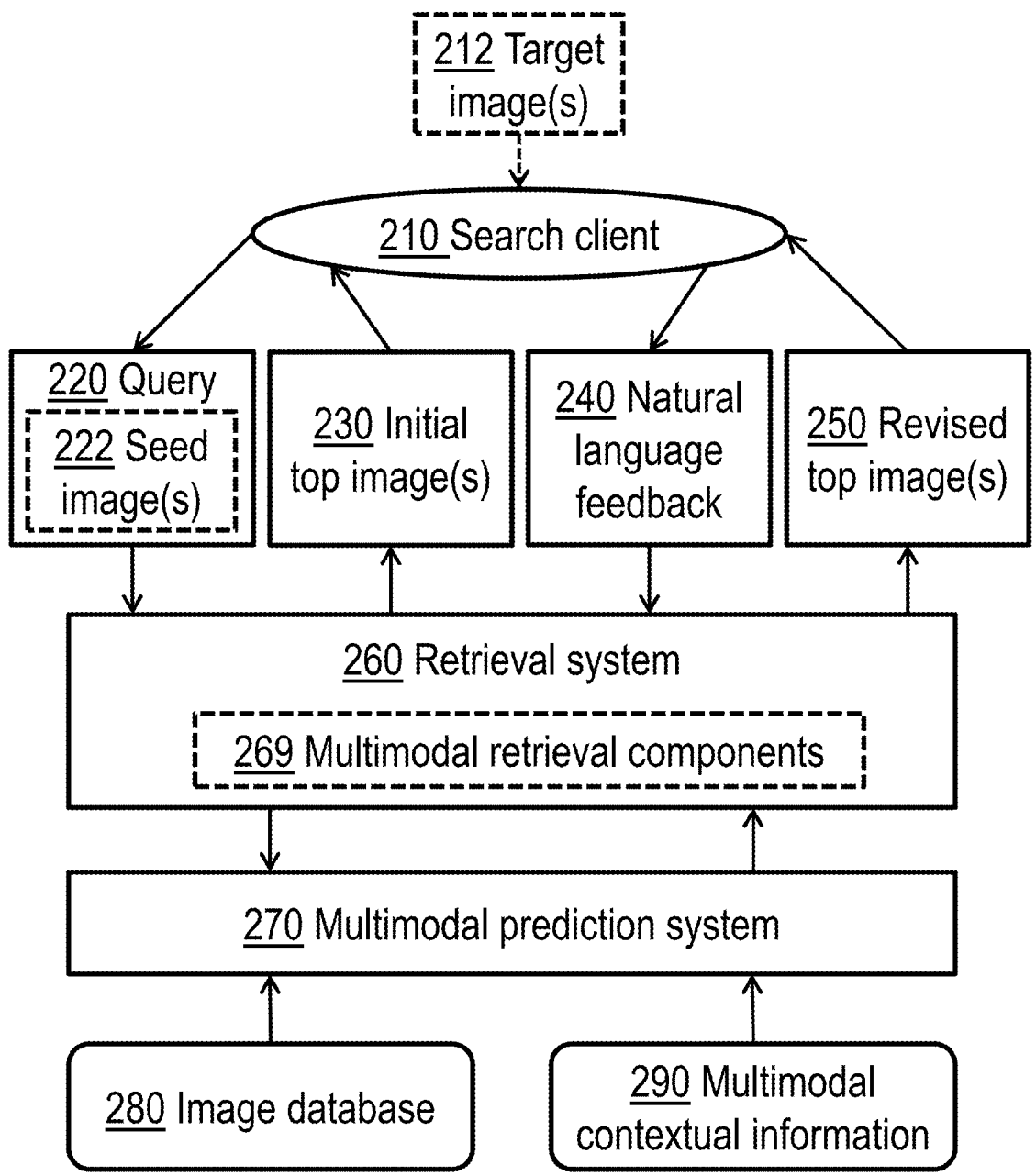
FIG. 2 is a combined block/flow diagram depicting an exemplary dialog-based image retrieval system with contextual information, according to an illustrative embodiment of the present invention.

FIG. 2 is a combined block/flow diagram depicting an exemplary dialog-based image retrieval system with contextual information, according to an illustrative embodiment of the present invention. In an illustrative embodiment, search client 210 may correspond generally to search client 111, retrieval system 260 may correspond generally to search engine 103, multimodal retrieval components 269 may correspond generally to application 105, multimedia prediction system 270 may correspond generally to cognitive system 107, and databases 280 and 290 may correspond to storage 108. Further aspects of interactive image search techniques usable with embodiments of the present invention are discussed in Wu with reference to FIGS. 3, 5, and 6.

In some embodiments, the search client 210 may include an interface through which a human user (not shown) may interact with retrieval system 260. As further discussed below with reference to FIGS. 8 and 9, the search client 210 may alternatively include software code which simulates actions characteristic of a human user in order to facilitate development and testing. Target image(s) 212 may represent an item which the user is looking for, which could be a mental image in the mind of a human user, or could be input to or generated by a simulated user.

In some embodiments, target image(s) 212 (or a representation thereof) may be included within query 220 as seed image(s) 222. For example, a human user might find an image which is similar, but not identical, to the desired search result (e.g., the target image 212), and may include this image as a seed image 222 within the query 220, where the query 220 specifies the difference(s) between the seed image 222 and the target image 212, e.g., "find a jacket like this but with a hood." Additionally or alternatively, search query 220 may comprise textual or audible NL statement, keyword-based search query, or annotations. For example, a user input may consist solely of an annotated seed image 222, where the annotation marks an object of interest in the seed image, in which case an embodiment may construct a search query 220 using only the set or a subset of the image features related to the object of interest.

However, this manner of initiating the search is not intended to be limiting on the illustrative embodiments. A search can be initiated in many other ways. For example, another possible way to start the search may be that the user does not provide any information, the system kick-starts the interaction by providing a random set of images in the initial iteration and seek user feedback as the next iteration. In another example way of initiating a search, the user may specify only a natural language statement, e.g., "yellow strappy handbags,") and the statement alone is used in the initial iteration to find a first result set as described herein. From this disclosure, those of ordinary skill in the art will be able to conceive many other ways of starting the search, and the same are contemplated within the scope of the illustrative embodiments.

Retrieval system 260 receives search query 220 from search client 210 and generates an initial set 230 of one or more candidate images, e.g., the top image(s) believed to be most responsive to the search query 220. Once the result set 230 has been produced by the search engine 260, an illustrative embodiment may analyze an image result to extract a set of the image features relevant to the subject of the user input. The embodiment matches the set of image features with a set of input features to determine a degree of correspondence between the image result and the user input. The match between an image feature and an input feature can be within a specified tolerance, and can be performed using any suitable matching algorithm.

Based on the degree of match between an image result and the user input, the embodiment may compute a confidence value corresponding to the image result. The confidence value represents the degree of match, and is usable to determine a degree to which the image result corresponds to the user input. The higher the confidence, the higher the correspondence, and vice-versa. A result set 230 may include only a subset of image results having a confidence value greater than a threshold confidence value. A result set 230 may include image results that achieve different degrees of confidence relative to one another. One embodiment ranks and re-arranges the image results in the result set according to their respective confidences.

Responsive to the initial set of top candidate images 230, the search client 210 (e.g., a human user or a simulated user) can provide natural language feedback 240 to retrieval system 260, e.g., "do you have something like the first option but in red." The feedback 240 may be elicited by initiating an NL conversation with the user, for example, asking a question in NL, e.g., "which of these do you like?" or making suggestive NL statements, e.g., "I think you will like these."

Moreover, in some embodiments, feedback 240 may take forms other than natural language: for example, a user could indicate which of the candidate images are most relevant (e.g., similar to the target image) by clicking on relevant images. If the user indicates a preference for one or more image response from the presented image set, an embodiment may extract a set of image features from each such image result.

The system 260 can use the feedback 240 to generate a revised set of top candidate images 250. The system 260 may prepare a new result set 250 using data from repositories 280 and 290, or the system 260 may instead narrow the prior result set 230 instead of constructing a new result set 250. System 260 may perform a relevance determination of the image results in revised result set 250 based on feature matching and confidence computation in a manner similar to that discussed above with reference to initial result set 230.

The image results in result set 250 may be closer to the user's search objective (e.g., more similar to target image 212) as compared to the image results in result set 230 because the NL feedback 240 assists in clarifying the user's search objective. Thus, illustrative embodiments of the present invention provide a conversational image retrieval, with goal-driven dialog, where user 210 provides feedback 240 in natural language, and agent 260 outputs retrieved images 250.

An iterative process of receiving feedback 240 from the client and providing revised top candidate images 250 to client may continue until a predetermined criteria is met, such as a user indicating that an image result in a result set satisfies the user's search objective (e.g., sufficiently similar to target image 212), or a predetermined number of iterations having been performed. For example, an exit condition may be that at least threshold fraction of the result set has a confidence value greater than a threshold confidence value. Another example of an exit condition may be a user input the indicates that the user is satisfied with the last result set or has otherwise chosen to exit the process.

An illustrative embodiment which allows multiple images per turn (e.g., result sets 230 and/or 250 can include multiple images) could achieve better retrieval performance. In some embodiments, however, it may be desirable to focus on a simplified scenario with a single image per interaction (e.g., result sets 230 and 250 each include only one candidate image). In other embodiments, it may be desirable to instead allow the user to select one image out of a list of multiple candidate images to provide feedback on.

In formulating the candidate image sets 230 and 250, retrieval system 260 interacts with multimodal prediction system 270 (optionally, through multimodal retrieval components 269), in a manner further discussed below with reference to, e.g., FIGS. 3, 4, 6 and 7. Multimodal prediction system 270 utilizes input from both image database 280 and multimodal contextual information repository 290. Image database 280 stores a corpus of images from which the candidate images 230 and 250 are selected, while multimodal contextual information 290 provides multimodal contextual information, e.g., structured and/or unstructured metadata describing the images (or, perhaps more specifically, subject matter shown in the images) stored in database 280.

Figure 3:
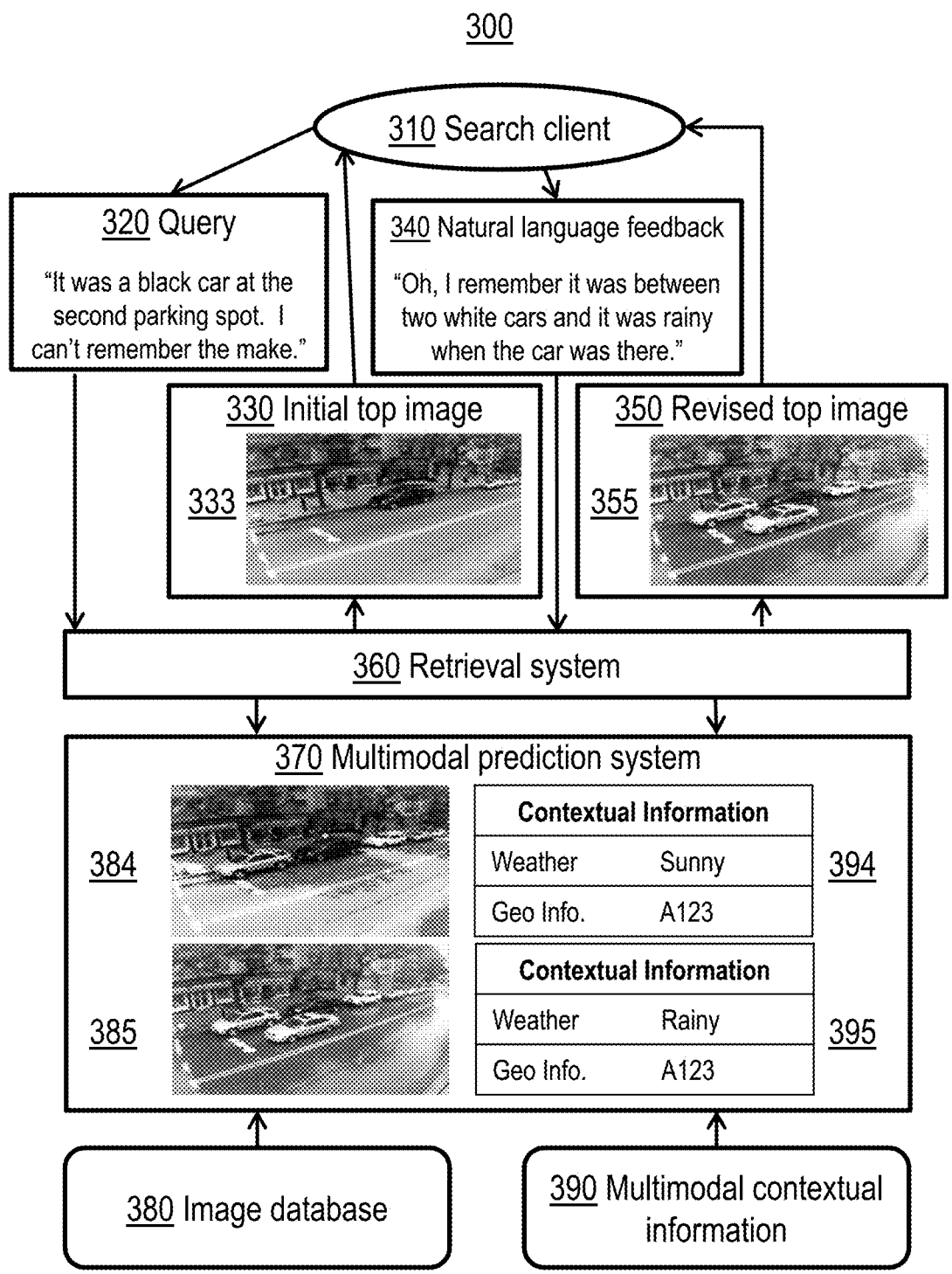
FIG. 3 is a combined block/flow diagram depicting an exemplary safety/security use case (surveillance video) with the system of FIG. 2.
Figure 4:
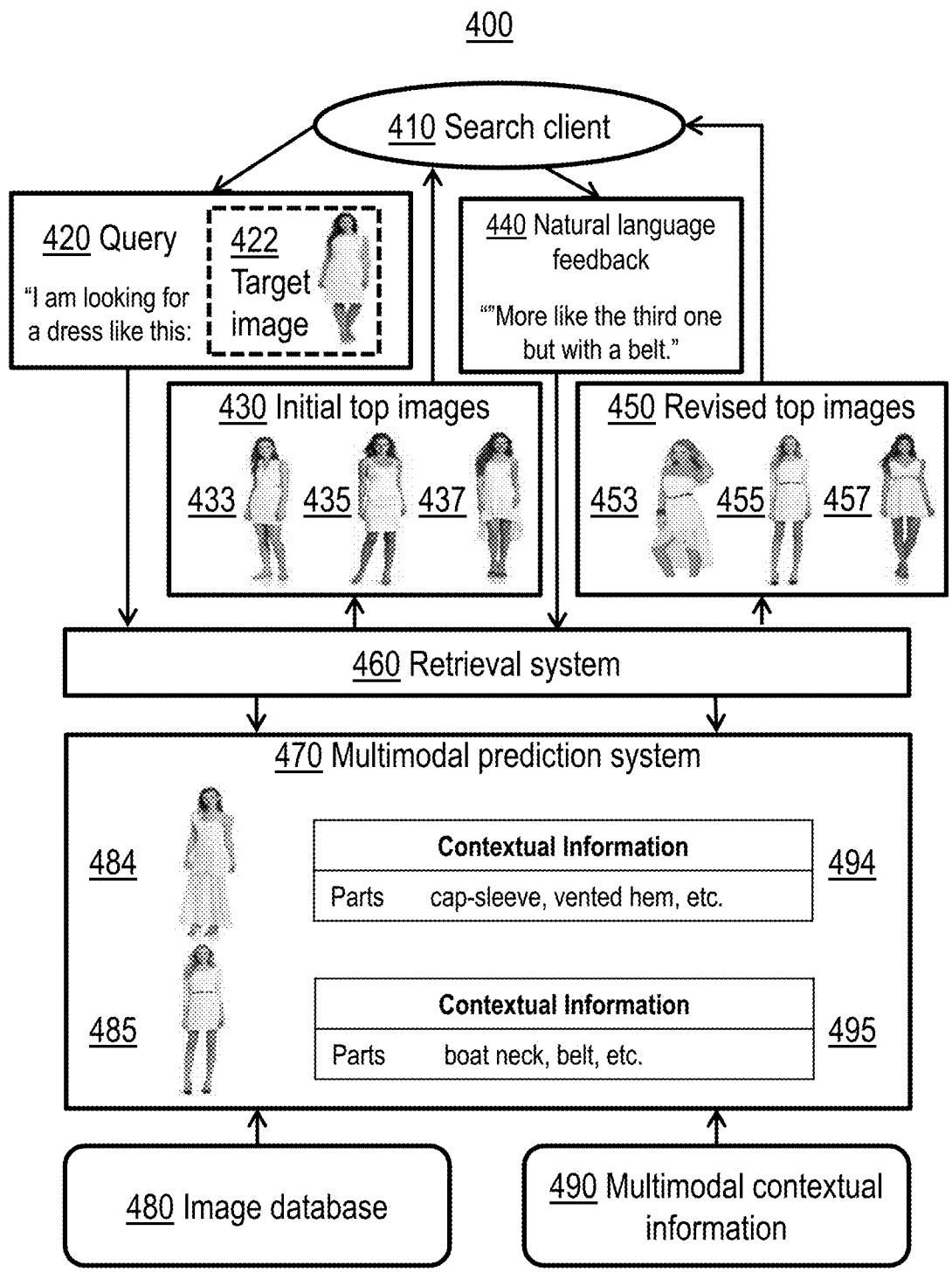
FIG. 4 is a combined block/flow diagram depicting an exemplary fashion shopping assistant use case with the system of FIG. 2.

Illustrative embodiments of the present invention may be used to improve interactive image retrieval in any one of a number of applications, including but not limited to retail, safety/security, healthcare, and fashion/design. FIGS. 3 and 4 show exemplary use cases (e.g., practical applications) for an illustrative embodiment of the present invention. However, the specific applications shown are merely examples of the numerous domains in which illustrative embodiments of the present invention may be used to improve interactive image retrieval.

FIG. 3 is a combined block/flow diagram depicting an exemplary safety/security use case (surveillance video) with the system of FIG. 2. Elements 310-390 in FIG. 3 respectively correspond to elements 210-290 in FIG. 2. Here, the user (via search client 310) provides a natural language query 320 (without a target or seed image): "It was a black car at the second parking spot. I can't remember the make." Accordingly, the initial image result 330 (which could be part of a set of results, or could be the single top-ranked image) provided by retrieval system 360 includes image 333, which shows a black car at the second parking spot as described in query 320. The user (via search client 310) provides natural language feedback 340 responsive to the initial image result set 330: "Oh, I remember it was between two white cars and it was rainy when the car was there." The additional information provided in feedback 340 allows for a revised image result set 350 (which again could be part of a set of results, or could be the single top-ranked image) in which image 333 (which satisfies the initial query 320 but which includes neither white cars nor rain) is replaced with image 355 (which includes both the two white cars and the rain—thus satisfying the additional criteria newly indicated in the feedback 340).

In order to provide the revised image results 350 responsive to the feedback 340, multimodal prediction system 370 uses both data retrieved from image database 380 (images 384 and 385) and data retrieved from multimodal contextual information store 390 (contextual information 394 and 395). In the example shown in FIG. 3, contextual information 394 indicates that image 384 was taken at geographic location A123 when the weather was sunny, and contextual information 395 indicates that image 385 was taken at geographic location A123 when the weather was rainy. Although images 384 and 385 both show a black car at the second parking spot between two cars, the multimodal contextual information indicates that image 385—but not image 384—was taken when it was rainy, thus satisfying all of the conditions set forth in query 320 and feedback 340. Thus, image 385— rather than image 384—is indicated as the top-ranked image 355 within the revised image result set 350 responsive to feedback 340.

FIG. 4 is a combined block/flow diagram depicting an exemplary fashion shopping assistant use case with the system of FIG. 2; Like elements 310-390 in FIG. 3, elements 410-490 in FIG. 4 respectively correspond to elements 210-290 in FIG. 2. Here, the user (via search client 410) provides a natural language query along with a target/seed image 422: "I am looking for a dress like this." Retrieval system 460 returns an initial result set 430 including three images 433, 435, and 437, all of which show dresses similar to target image 422.

The user (via search client 410) provides natural language feedback 440 responsive to the initial image result set 430: "More like the third one [e.g., image 437] but with a belt." Notably, the initial target image 422 did not include a belt (nor did query 420 specify a belt), and thus none of the initial result set 430 included a belt. Thus, the additional image provided in feedback 440 allows for a revised image result set 450 in which all of the images 453, 455, and 457 include a belt (and are otherwise similar to the dress shown in image 437).

In order to provide the revised image results 450 responsive to the feedback 440, multimodal prediction system 470 uses both data retrieved from image database 480 (images 484 and 485) and data retrieved from multimodal contextual information store 490 (contextual information 494 and 495). In the example shown in FIG. 4, contextual information 494 indicates that image 484 shows a dress with a cap-sleeve and vented hem, while contextual information 495 indicates that image 485 shows a dress with a boat neck and belt. The contextual information 494 and 495 could also include, for example, information such as the price and availability (e.g., in stock or back-ordered) of the items shown in images 484 and 485. Here, the multimodal contextual information 494 and 495 indicates that image 485—but not image 484— includes a belt, thus satisfying the further criterion set forth in feedback 440. Thus, image 485—rather than image 484— is included (as image 455) within the revised image result set 450 responsive to feedback 440.

Multimodal contextual information 490 often contains data which cannot be readily determined based solely on the corresponding image. For example, multimedia contextual information 490 may contain side information, such as textual descriptions associated with images of product items. Product attributes can be extracted from the rich textual information contained in a product website (e.g., a website maintained by a manufacturer or retailer of the product), including the product title, product summary, and detailed product description. An attribute label for an image may be considered as present if its associated attribute word appears at least once in the metadata. In retail (e.g., online shopping and/or e-commerce) applications, the contextual information 490 may also include the price and availability of the product, which is not necessarily correlated with any visual attribute that can be determined from the image itself. In an illustrative embodiment of the present invention, human-written relative descriptions of the images may be associated with real-world context, including side information derived from product descriptions and customer reviews.

However, the process of crawling product information for attributes to associate with individual product images, while automated, can lead to noisy and incomplete attribute features. Many websites (e.g., customer reviews) may also contain product metadata on titles and categories, but the information tends to be short, generic, and incomprehensive. Extracted attribute labels are more descriptive with respect to the visual features (e.g., fashion styles) that are present in the images. By way of example, for the image 512 in FIG. 5, the textual metadata from customer reviews was: "Title: Paradise Found Women's Hibiscus Summer Princess Seam Mini Sundress" and "Category: women, clothing, dresses, casual." By contrast, the extracted attribute labels include "dress, sundress, print, rib, seam, wash, fit, fitted, mini, hem, shoulder, strap, zipper, paradise, please, summer." As another example, for the image 781 in FIG. 7, the extracted attribute labels are shown in 791 to include "halter, dress, striped, cotton, gauze, wash, maxi;" while the textual metadata from customer reviews was: "Title: Roxy Juniors Southwest Long Gauze Maxi Dress" and "Category: women, clothing, dresses, casual."

Figure 5:
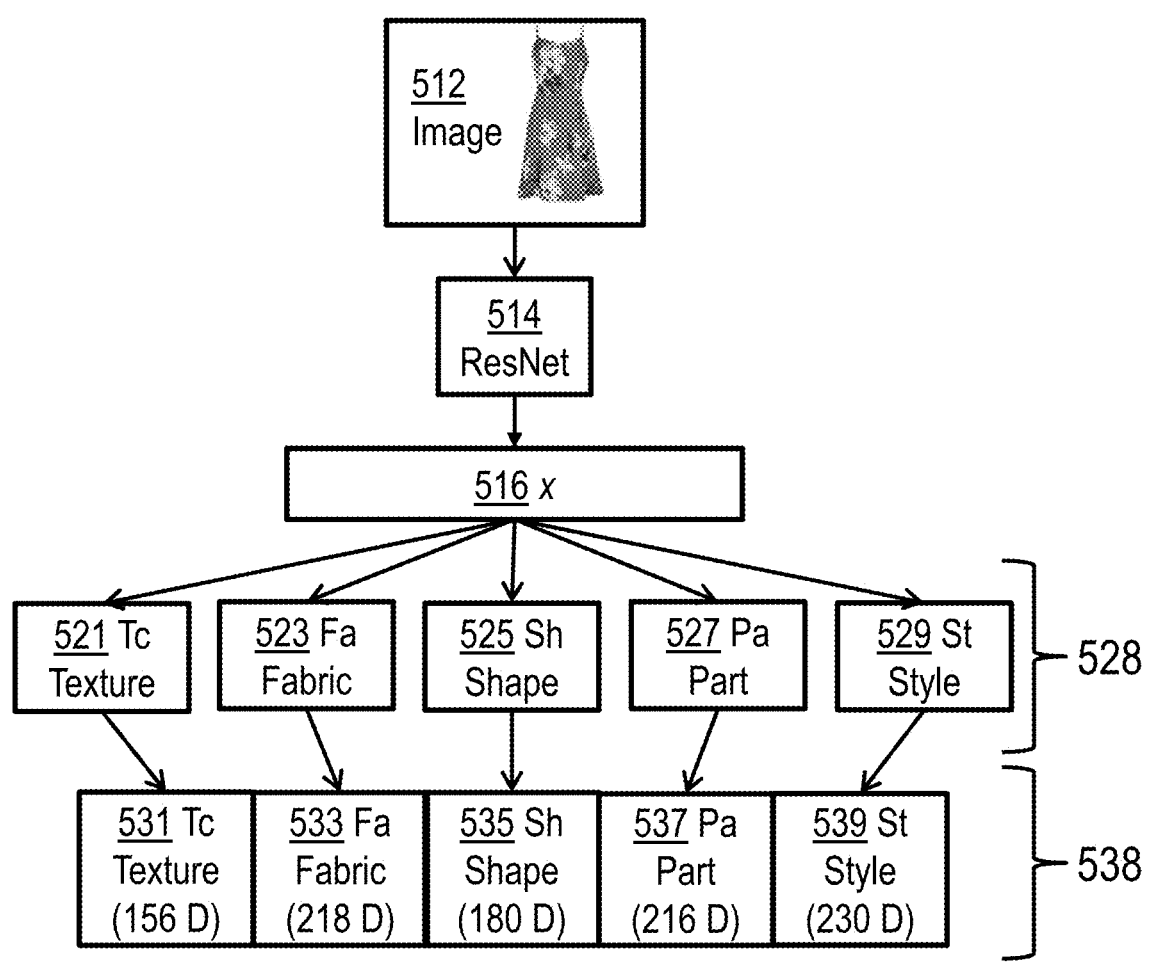
FIG. 5 is a combined block/flow diagram depicting an attribute prediction network, according to an illustrative embodiment of the present invention.

FIG. 5 is a combined block/flow diagram depicting an attribute prediction network, according to an illustrative embodiment of the present invention. To alleviate the issue of noisy and incomplete attribute features resulting from automated crawling for attributes to associated with images, illustrative embodiments use the attribute prediction network (AttrNet) 500 to infer estimated attributes, which can then be used by the interactive retriever discussed with reference to FIGS. 2-4, 6 and 7, as well as the user simulator discussed below with reference to FIGS. 8 and 9. For each image x in the image database (e.g., 280 in FIG. 2, 380 in FIG. 3, 480 in FIG. 4, 680 in FIG. 6, 780 in FIG. 7, and/or 880 in FIG. 8), the AttrNet predicts a set of attribute features $\{\phi^a(x) \in \mathbb{R}^{D_a}\}$ where a is an attribute type indicator, and $D_a$ is the number of attributes within the corresponding attribute type.

In the illustrative embodiment shown in FIG. 5, the set of product attributes is defined by adopting the fashion attribute vocabulary curated in DeepFashion, which is currently the most widely adopted benchmark for fashion attribute prediction. See, e.g., Liu et al., "DeepFashion: Powering Robust Clothes Recognition and Retrieval with Rich Annotations", 2016 IEEE Conference on Computer Vision and Pattern Recognition (CVPR), June 2016, pp. 1096-1104, which is incorporated by reference herein in its entirety for all purposes. DeepFashion includes 1000 different attributes classified into 5 attribute types: texture, fabric, shape, part, and style. More particularly, as shown in 531-539 of FIG. 5, the 1000 attributes comprise 156 texture attributes, 218 fabric attributes, 180 shape attributes, 216 part attributes, and 230 style attributes. It should be noted that the DeepFashion attribute vocabulary is specific to fashion (e.g., the use case discussed above with reference to FIG. 4), while aspects of the present invention are applicable in many other domains (e.g., the use case discussed above with reference to FIG. 3). Use of the DeepFashion attribute vocabulary (or any other attribute vocabulary) is merely one possible implementation falling within the scope of the present invention and the ability of one skilled in the art.

The attribute prediction model 500 in FIG. 5 is a multi-column neural network with shared lower layers, which takes an image 512 as input, and outputs the attribute tags 531-539, collectively 538. The shared lower layers consist of a pre-trained ResNet-152 network 514 up to the penultimate layer. Residual networks, including ResNet-152, are described in, e.g., He et al., "Deep Residual Learning for Image Recognition", 2016 IEEE Conference on Computer Vision and Pattern Recognition (CVPR), June 2016, pp. 770-778, which is incorporated by reference herein in its entirety for all purposes. The last fully connected layer is replaced by a trainable linear projection, followed by rectified linear unit (ReLU). For notational simplicity, x is used herein to represent both the image and its vector representation $x \in \mathbb{R}^{D_x}$. The projected image embedding x 516 is then passed to two independent linear layers with ReLU applied to the hidden layer, as shown in 528, comprising 521-529. The final outputs are rectified by the sigmoid function to generate the attribute features $\phi^a(x)$ 538, comprising 531-539.

Figure 6:
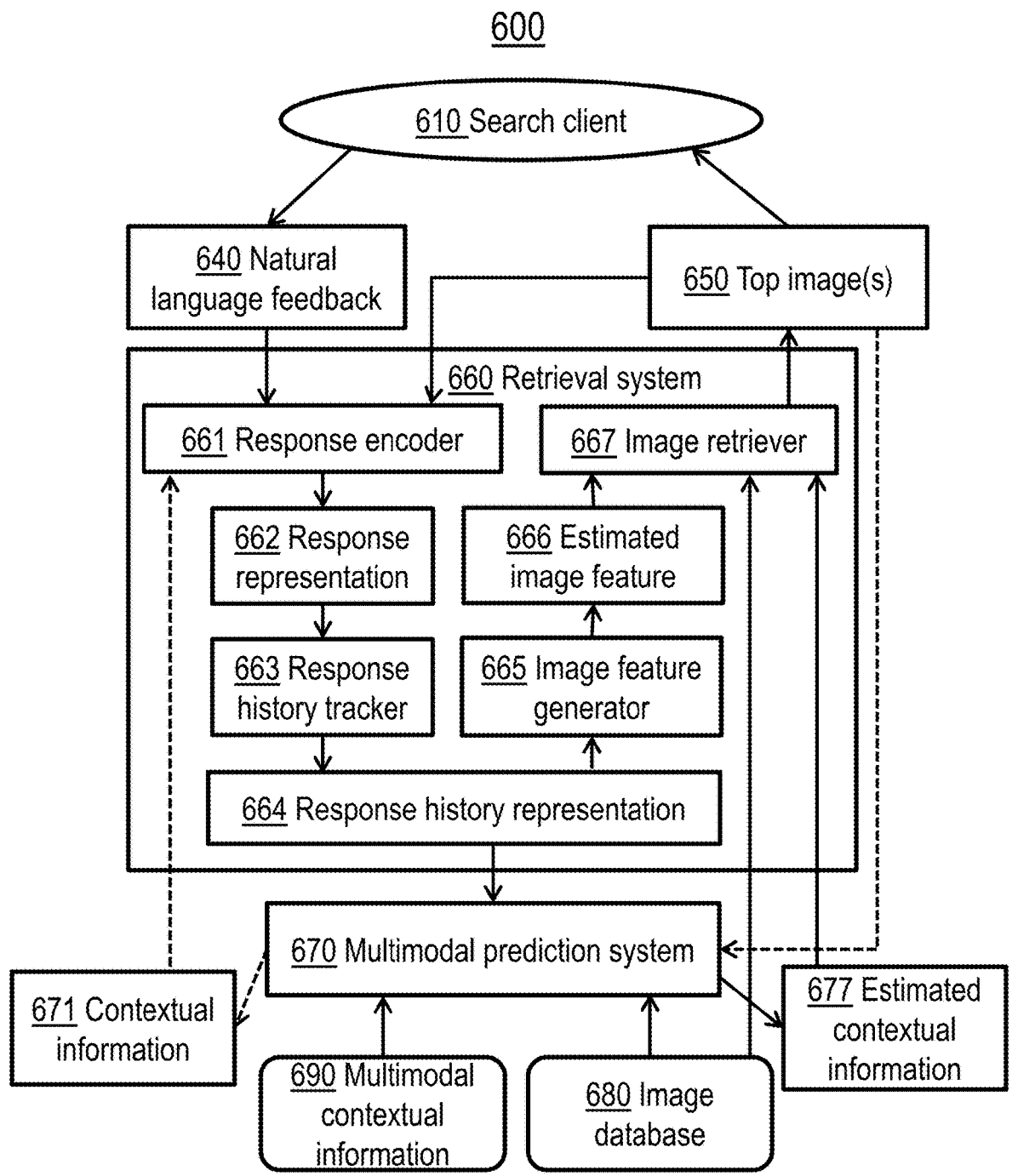
FIG. 6 is a combined block/flow diagram depicting interactive image retrieval system components, according to an illustrative embodiment of the present invention.

FIG. 6 is a combined block/flow diagram depicting interactive image retrieval system components, according to an illustrative embodiment of the present invention. Elements 610 and 640-690 in FIG. 6 respectively correspond to elements 210 and 240-290 in FIG. 2. As previously discussed, obtaining information from the user and providing image results to the user is an iterative process. Thus, element 640 could also be viewed as encompassing element 220 as well as element 240 in FIG. 2, and element 650 could be viewed as encompassing element 230 as well as element 250 in FIG. 2. The natural language feedback 640 (or more generally user-specified criteria provided in either an initial query or subsequent feedback) and the image results 650 (e.g., to which the feedback 640 is responsive) are provided to response encoder 661 within retrieval system 660. Response encoder 661 generates a response representation 662 which captures the relationship between the natural language feedback 640 and the images 650 to determine the revised or additional criteria specified by the user through the feedback. More particularly, the response encoder 661 may embed the candidate image 650, the candidate image's attribute features, and the corresponding user feedback 640 into a joint visual semantic representation.

Response history tracker 663 determines the manner in which the response representation 662 (representing feedback 640) correlates to prior responses (e.g., feedback or initial query) from the user. Thus, response history tracker 663 maintains information regarding the entire series of responses (response history representation 664), which is updated to reflect the most recent response (representation 662). In other words, response history tracker 663 aggregates the encoded response representation 662 with the dialog history from previous turns producing response history representation 664, e.g., in the form of a query vector. Response history representation 664 is provided to multimodal prediction system 670. The multimodal prediction system may use response history representation 664, as well as data retrieved from image database 680 and multimodal contextual information (and, optionally, one or more of the images within result set 650) to determine contextual information 671 (e.g., regarding images 650 to which the feedback 640 is directed), which may be provided to response encoder 661.

Contextual information 671 can advantageously allow for more accurate interpretation of natural language feedback 640, especially relative queries, which can allow for more flexible and more precise descriptions of the items to be searched. For example, the sentence "No, I want it to be lighter" could have an entirely different meaning based on contextual cues—if the user was shown images of a jacket, the user may desire a thinner material; if the user was shown images of a car, the user may prefer a paler shade of paint; and if the user was shown images of coffee, the user may want a higher concentration of creamer. As another example, the user could say "show me something something less expensive," which would be unclear without the prices of the items—an example of contextual information which typically cannot be derived from the image itself.

Response history representation 664 is also provided to image feature generator 665, which estimates what features an image should have in order to satisfy the various criteria indicated by the user through the series of responses. For example, with reference to FIG. 3, query 320 specified that the image should show a black car at the second parking space, while feedback 340 further specified that the image should show the black car between two white cars during rainy weather. Thus, image 385 was chosen because its contextual information 395 indicated that the weather was rainy rather than sunny as in image 384. The estimated image feature data 666 generated by the image feature generator 665 is provided to the image retriever 667, along with estimated contextual information 677 generated by multimodal prediction system 670. Image retriever 667 selects image(s) 650 from image database 680, e.g., which best match the estimated image features 666 and the estimated contextual information 677.

Figure 7:
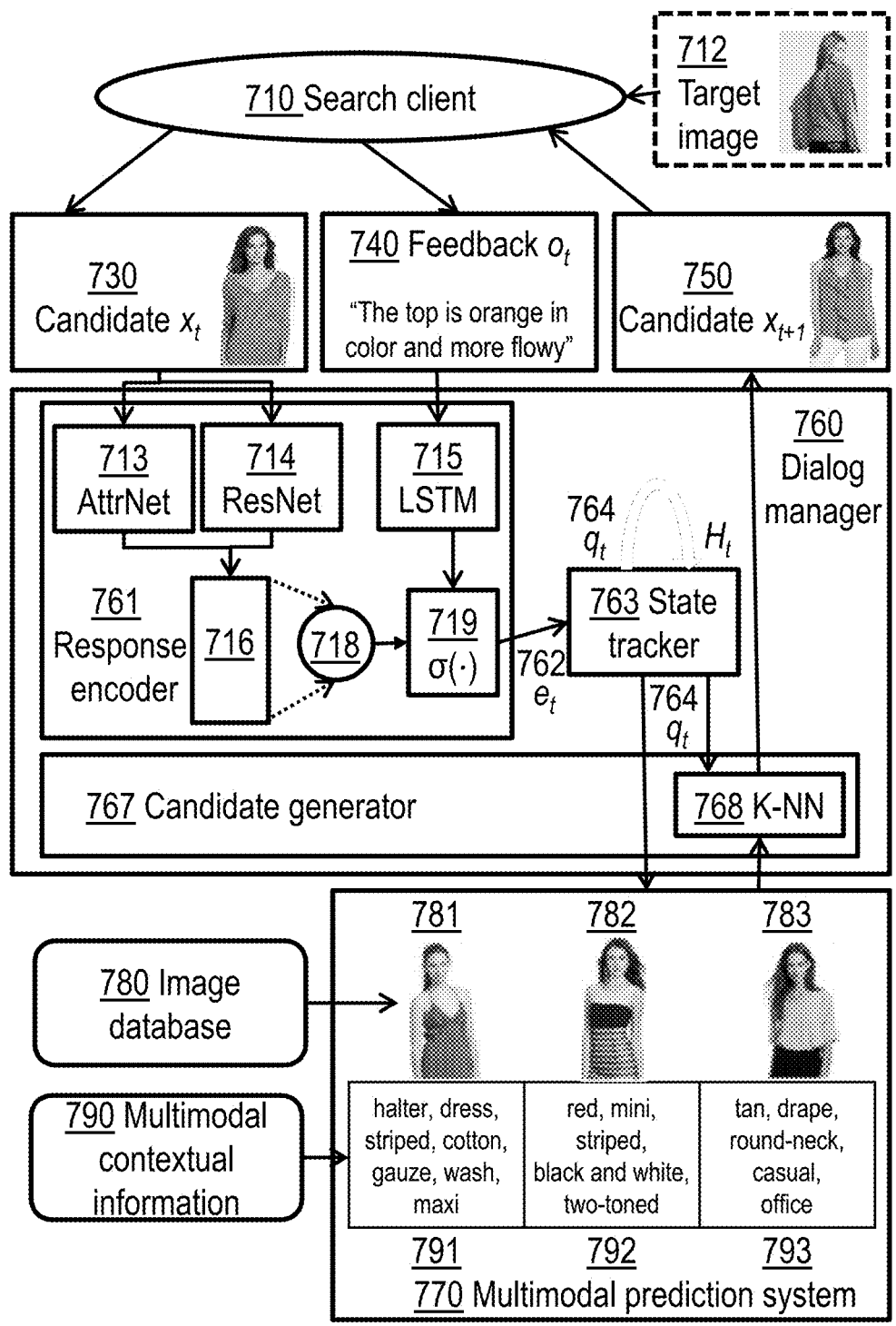
FIG. 7 is a combined block/flow diagram depicting an attribute-aware dialog-based interactive image retrieval system, according to an illustrative embodiment of the present invention.

FIG. 7 is a combined block/flow diagram depicting an attribute-aware dialog-based interactive image retrieval system, according to an illustrative embodiment of the present invention. Elements 710, 712, 730, 740, 750, 760, 770, 780, and 790 in FIG. 7 generally correspond to elements 210, 212, 230, 240, 250, 260, 270, 280, and 290 in FIG. 2. A (real or simulated) user 710 interacts with a retrieval agent 760 over multiple dialog turns. At the t-th dialog turn, the system 760 presents a candidate image $x_t$ 730 selected from retrieval database 780 to the (human or simulated) user via client 710. The user then provides a feedback sentence $o_t$ 740 describing the differences between the candidate image $x_t$ 730 and the desired image 712. Natural language feedback $o_t$ 740 received from search client 710 (e.g., the human or simulated user) at turn t responsive to candidate image $x_t$ 730 (the candidate at turn t) indicates that the desired item (e.g., the top shown in target image 712, which here is not provided in query 722, and may be known only to the user) "is orange in color and more flowy." It should be noted that this feedback 740 is provided as a relative caption, which loses meaning if not analyzed in the context of the referenced image 730.

The natural language feedback 740 and the image to which it pertains 730 are provided to response encoder 761 within dialog manager 760, which corresponds generally to 661 within 660 in FIG. 6. At the t-th dialog turn, response encoder 761 embeds the candidate image $x_t$ 730, the candidate image's attribute features $\{\phi^a(x_t)\}$ and the corresponding user feedback $o_t$ 740 into a joint visual semantic representation 762, $e_t = \mathcal{R}(x_t, \{\phi^a(x_t)\}, o_t) \in \mathbb{R}^{D_e}$. First, the candidate image 730 is encoded using AttrNet 713 and ResNet 714 as discussed above with reference to FIG. 5, with AttrNet 713 generally corresponding to 500 and ResNet 714 generally corresponding to 514. As discussed above with reference to FIG. 5, the output 716 from AttrNet 713 and ResNet 714 will include image vector x (corresponding to 516 in FIG. 5) and a set of attribute features $\{\phi^a(x_t) \in \mathbb{R}^{D_a}\}$ (corresponding to 538 in FIG. 5).

Then, the natural language feedback 740 may be parsed to extract a set of response features from a user's NL statements 740. A response feature generally refers to a part of speech in a NL sentence according to a grammatical construct of the NL and references a subject of the NL sentence. For example, in the NL statement "how about some handbags like this?" the subject is "handbags". Accordingly, one response feature is "handbags" and synonyms of "handbags." Additional response features may be based on the phrase "like this," which leads to the creation of response features that indicate a referential similarity to something that is also provided in the input, to wit, the image features.

Thus, the natural language feedback 740, which may be viewed as a sequence of word indices $o_t$, is encoded by a recurrent neural network (RNN) implementing a long short-term memory (LSTM) 715, into a vector $e_t^o \in \mathbb{R}^{D_e}$. Alternatively, words in the user feedback sentence can be represented with one-hot vectors and then embedded with a linear projection followed by a deep convolutional neural network (CNN) as described in, e.g., Yoon Kim, "Convolutional Neural Networks for Sentence Classification", Proceedings of the 2014 Conference on Empirical Methods in Natural Language Processing (EMNLP), October 2014, pp. 1746-1751, which is incorporated by reference herein in its entirety for all purposes.

Next, the image feature $x_t$ and the attribute features $\{\phi^a(x_t)\}$ are combined to obtain the attribute-aware visual representation $e_t^{x+}$. The illustrative embodiment shown in FIG. 7 uses an attention mechanism, similar to that discussed below with reference to FIG. 9C, where a joint visual representation is obtained in 718 based on the weighted sum of the image feature $x_t$ and each of the attribute features $\{\phi^a(x_t)\}$. The attention weights may be computing using a scoring function which takes as input the sum of the projected visual feature and the feedback representation.

Finally, response encoder 761 generates $e_t$ 762, which corresponds to response representation 662 in FIG. 6, and is provided to the state tracker 763, which corresponds to the response history tracker 663 in FIG. 6. In the embodiment shown in FIG. 7 and further discussed below with reference to FIG. 9C, given the attribute-aware visual representation $e_t^{x+}$ (from 718) and the feedback representation $e_t^o$ (from 715), the joint visual semantic representation is computed as $e_t = \sigma(e_t^{x+} + e_t^o)$, where $\sigma$ is a ReLU layer.

Another embodiment, discussed with reference to FIG. 9B, may utilize an approach based on direct feature concatenation, followed by a linear projection to obtain a vector of length $D_e$. Thus, the attribute-aware visual representation $e_t^{x+}$ (from 718) and the sentence representation $e_t^o$ (from 715) may instead be concatenated and embedded through a linear transformation to obtain the final response representation 762 $e_t = W(e_t^{x+} \oplus e_t^o)$, where $\oplus$ is the concatenation operator and $W \in \mathbb{R}^{D \times 2D}$ is the linear projection.

The state tracker 763 aggregates the aforementioned representation $e_t^{x+}$ 762 with the dialog history from previous turns $H_t = \{x_1, o_1 \ldots x_t, o_t\}$, producing a query vector $q_t \in \mathbb{R}^{D_q}$. The state tracker 763 is based on a gated recurrent unit (GRU). The forward dynamics of the state tracker are $h_t = GRU(e_t, h_{t-1})$, $q_t = W^q h_t$, where $h_t \in \mathbb{R}^{D_h}$ is the updated hidden state and $W^q \in \mathbb{R}^{D_q \times D_h}$ is a trainable matrix. This memory-based design of the state tracker 763 allows the model to sequentially aggregate the information from user feedback to localize the candidate image to be retrieved. $q_t$ is output as 764 and corresponds to response history representation 664 in FIG. 6. The query vector $q_t$ 764 produced during turn t becomes the history vector $H_t$ during the next turn t. The query vector $q_t$ 764 is also provided to both the candidate generator 767 and the multimodal prediction system 770.

Candidate generator 767 corresponds generally to image retriever 667 in FIG. 6. The candidate generator 767 searches for a new candidate image 750 given the aggregated query vector $q_t$ 764 received from state tracker 763. In an illustrative embodiment, each image in the retrieval database 780 may be represented using a concatenation-based attribute-aware visual representation, e.g., $d(x) = W^q[x, \{\phi^a(x)\}] \in \mathbb{R}^{D_h}$. The candidate image 750 can then be selected using the L2 distance between each database feature $d(x)$ and the query vector $q_t$ 764.

Given the feature representation of all images from the retrieval database 780 ($\mathfrak{T} = \{I_i\}_{i=0}^N$), a sampling probability can be computed based on the distances between the query vector $q_t$ 764 and each image feature $d(x)$. For example, the sampling probability may be modeled using a softmax distribution over the top-K nearest neighbors of $q_t$ 764: $\pi(j) = e^{-d_j} / \sum_{k=1}^K e^{-d_k}$, $j = 1, 2, \ldots K$, where $d_k$ is the L2 distance of $q_t$ 764 to its k-th nearest neighbor within the aforementioned feature representation of all images from the retrieval database 780. This calculation is represented by K-NN (k nearest neighbors) 768 within candidate generator 767. Given the sampling distribution, various approaches may be taken to sample the candidate image, denoted as $x_{t+1} = I_{j'}$, including a stochastic approach where $j' \sim \pi$, and a greedy approach where $j' = \arg\max_j (\pi_j)$. An illustrative embodiment may use the stochastic approach during training, and the greedy approach during testing/inference.

Thus, based on the user feedback 740 and the dialog history up to turn t ($H_t$), the dialog manager 760 can select the next candidate image $x_{t+1}$ 750 from database 780 and presents it to the user via client 710. Moreover, multimodal projection system 770 corresponds generally to 670 in FIG. 6, as well as 270 in FIG. 2, 370 in FIG. 3, and 470 in FIG. 4. In a manner similar to that previously discussed with reference to FIGS. 3 and 4, multimodal prediction system retrieves images 781, 782, 783 from image database 780 and the multimodal contextual information 791, 792, 793 respectively corresponding to images 781, 782, 783 from the multimodal contextual information repository 790. For example, as shown in FIG. 7, the multimodal contextual information 791 for image 781 includes "halter, dress, striped, cotton, gauze, wash, maxi;" the multimodal contextual information 792 for image 782 includes "red, mini, striped, black and white, two-toned;" and the multimodal contextual information 793 for image 783 includes "tan, drape, round-neck, casual, office." This multimodal contextual information could be extracted attribute labels as discussed above, or it could also include information about price and/or availability for purchase (e.g., in-stock status). The multimodal prediction system 770 receives the query vector $q_t$ 764 from state tracker 763 and provides estimated contextual information 777, corresponding generally to 677 in FIG. 6, to K-NN 768 within candidate generator 767, which corresponds generally to 667 in FIG. 6.

Given the trainable components of the response encoder 761, the state tracker 763, and the candidate generator 767, end-to-end optimization of the entire network of dialog manager 760 can be performed using the training process described with reference to FIG. 4 in Wu and/or the policy learning procedure discussed in Sections 3.2 to 3.2.2 of Guo18. More particularly, the network may be trained based on an efficient policy optimization strategy, employing triplet loss and model-based policy improvement. That said, a reinforcement learning (RL) training framework of directly optimizing the rank of the target image has been shown to outperform a supervised learning approach which is based on the triplet loss objective. Moreover, directly optimizing the ranking percentile metric in a supervised learning scheme is challenging since it is a non-differentiable function.

However, training a reinforcement learning (RL) model for this problem requires extensive exploration of the action space, which is only feasible if a large amount of training data is available. This problem is exacerbated in the case of natural language based user feedback, which requires an even larger exploration space as compared to approaches based on a fixed set of attributes. Furthermore, collecting and annotating the human-machine dialog data needed for training is prohibitively slow and expensive. It takes about one minute to collect one set of dialog with 10 rounds of interactions, so 120,000 sets of training dialogs would require 2,000 hours of annotation effort.

Accordingly, an illustrative embodiment of the present invention provides a user simulator, trained on human-written relative descriptions, which substitutes the role of a real user in training the dialog manager. The role of the user simulator (also known as a user model) in embodiments of the present invention is to act as a surrogate for real human users by providing text-based feedback describing the difference between the target image and the candidate image. In some embodiments, the user model/simulator can automatically generate sentences that describe the prominent visual differences between any pair of target and candidate images.

Thus, to mitigate the cumbersome and costly process of collecting and annotating human-machine dialogs as the system learns, an illustrative embodiment utilizes a model-based RL approach by training a user simulator based on a corpus of human-written relative descriptions. Specifically, to emulate a single dialog turn, where the user provides feedback regarding a candidate image relative to what the user has in mind, the user simulator generates a relative caption describing the differences between the candidate image and the user's desired image.

FIG. 8 is a combined block/flow diagram depicting an illustrative embodiment of the invention incorporating user modelling. In FIG. 8, elements 822, 830, 840, 870, 880, and 890 generally correspond to elements 222, 230, 240, 270, 280, and 290 in FIG. 2. However, in FIG. 8, search client 210 (and the associated human user) is replaced by user model 811. In the embodiment shown in FIG. 8, multimodal prediction system 870 receives the top candidate images 830 and target images 822. Using data retrieved from image database 880 and multimodal contextual information store 890, multimodal prediction system 870 can estimate contextual information 872 of target images 822 and can estimate contextual information 873 of the top candidate images 830. User model 811 receives the estimated contextual information of the target images 872 and of the top candidate images 873, as well as the target images 822 and top images 830 themselves. Based at least in part on the contextual information 872 and 873 estimated by the multimodal prediction system 870, user model 811 can generate natural language feedback 840 describing the differences between the candidate images 830 and the target images 822 in a manner similar to that discussed above with respect to human users.

In the illustrative embodiments discussed herein, the user simulator is trained on single-turn data and does not consider the dialog history. This reduces the sequence of responses to a "bag" of responses and implies that all sequences of a given set of actions (candidate images) are equivalent. Nevertheless, while the set of candidate images that maximize future reward (target image rank) are a set, selecting the image for the next turn naturally hinges on all previous feedback from the user. Therefore, the entire set of candidate images can be efficiently constructed sequentially. That said, it will be understood by one skilled in the art that there could be other embodiments of the present invention in which the user simulator does consider the dialog history.

An illustrative embodiment of the invention may include a system (e.g., 200, 300, 400, 600, 700, 800) for interactive image retrieval using natural language with contextual information. The system may include a contextual information prediction framework (e.g., 270, 370, 470, 670, 770, 870) that denoises and completes contextual information from image visual information. The system may also include a retrieval framework (e.g., 260, 360, 460, 660, 760) that combines user feedback, visual information, and contextual information to minimize users' interaction effort with the system. The system may further include a user model framework (e.g., 811) that predicts a user's natural language feedback given visual information and contextual information.

Figure 9A:
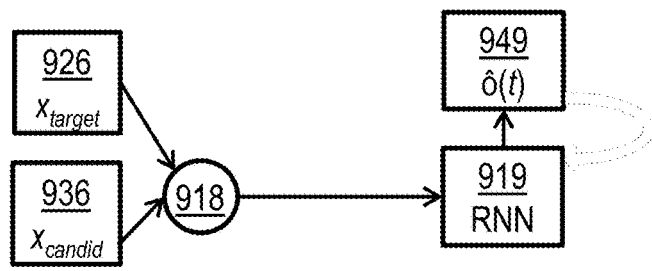
FIG. 9A shows an image-only user model (without attribute features) usable with an illustrative embodiment of the invention.

FIG. 9A shows an image-only user model (without attribute features) usable with an illustrative embodiment of the invention. More particularly, FIG. 9A shows the network structure of an encoder-decoder captioning model $\mathcal{F}$ that generates user feedback sentences using only $x_{target}$ 926—a representation of image features of target image 822 in FIG. 8—and $x_{candidate}$ 936—a representation of image features of candidate image 830 in FIG. 8: $\hat{o} = \mathcal{F}(x_{target}, x_{candidate})$, where $\hat{o}$ is a sequence of word indices. The difference 918 between $x_{target}$ 926 and $x_{candidate}$ 936 may be input into an initial state of RNN 919. Alternatively, feature concatenation can be used to fuse the image features of the target and the reference image pair, followed by generating the relative captions using a long short-term memory network, e.g., by applying the model described in Xu et al., "Show, Attend, and Tell: Show, Attend and Tell: Neural Image Caption Generation with Visual Attention", Proceedings of the 32nd International Conference on Machine Learning (ICML), Proceedings of Machine Learning Research (PMLR), v. 37, July 2015, pp. 2048-2057 (hereinafter "Xu"), which is incorporated by reference herein in its entirety for all purposes.

The result 949, representing the next word of the natural language feedback, is then concatenated with the embedding of the previous word and input into decoder RNN 919 at the next timestep. By way of example, after the difference 918 between $x_{target}$ 926 and $x_{candidate}$ 936 is input into an initial state of RNN 919, RNN 919 might produce as output 949 the first word of the natural language feedback 940, "Has," which is then fed back into RNN 919 to produce as output 949 the second word of the natural language feedback, "longer." The second word "longer" may be concatenated with the embedding of the first word "has," with the combination of the first two words "has longer" being fed back into RNN 919 to produce as output 949 the third word of the natural language feedback, "sleeves."

Figure 9B:
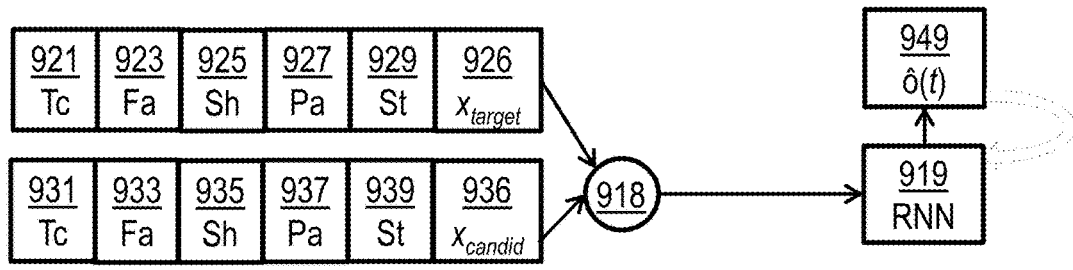
FIG. 9B shows an attribute-aware user model (without an attentional mechanism) according to an illustrative embodiment of the invention.
Figure 9C:
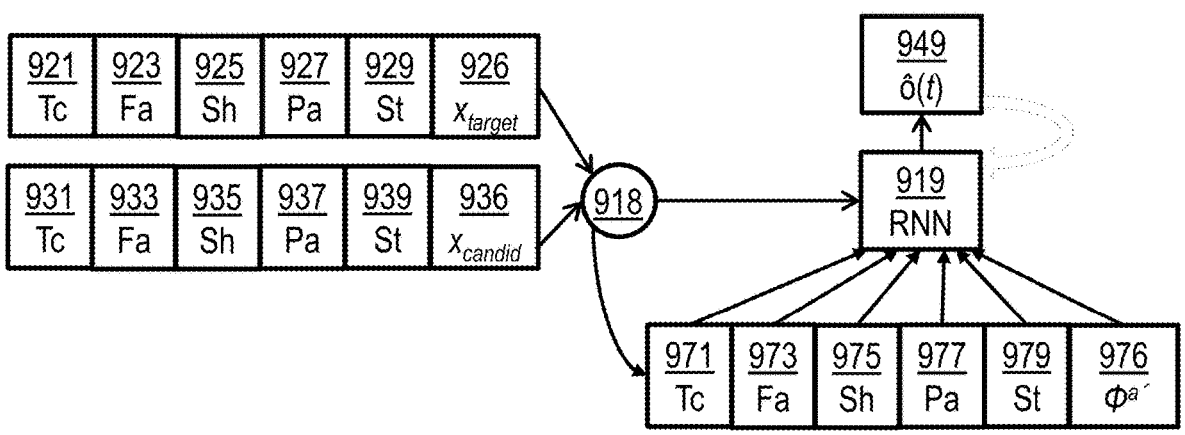
FIG. 9C shows an attribute-aware attentional user simulator according to an illustrative embodiment of the invention.

FIG. 9B shows an attribute-aware user model (without an attentional mechanism) according to an illustrative embodiment of the invention. Since item attributes are an elemental part of many of the phrases people use to search for items, they naturally share similar semantics with and can enhance the quality of the relative feedback simulator. Thus, in FIG. 9B, the image representations 926 and 936 are augmented with the predicted attribute features 921-929 and 931-939 as input to the encoder-decoder captioning model $\mathcal{F}$ that generates user feedback sentences $\hat{o} = \mathcal{F}(x_{target}, \{\phi^a(x_{target})\}, x_{candidate}, \{\phi^a(x_{candidate})\})$. In FIG. 9B, attribute features are incorporated into the relative captioner by first linearly projecting each set of predicted attribute features 921-929 and 931-939 to match the dimension of the hidden state of the decoder RNN 919 and then concatenating them with the image features 926 and 936. The difference 918 between the resulting target and reference features is then input into the initial state of the RNN 919 with the previous hidden state as the query vector. As discussed above with reference to FIG. 9A, the result 949 is then concatenating with the embedding of the previous word and input into the decoder RNN as the next timestep.

FIG. 9C shows an attribute-aware attentional user simulator according to an illustrative embodiment of the invention. In FIG. 9C, as in FIG. 9B, attribute features are incorporated into the relative captioner by first linearly projecting each set of predicted attribute features 921-929 and 931-939 to match the dimension of the hidden state of the decoder RNN 919 and then concatenating them with the image features 926 and 936. The difference 918 between the resulting target and reference features is then input into the initial state of the RNN 919—and also attended to after generating each word via additive attention—with the previous hidden state as the query vector. Adding this visual attention mechanism, as discussed in Xu, better captures the localized visual differences: the loss function of the relative captioner is the sum of the negative log likelihood of the correct words.

FIGS. 11-14 show unexpected results from experiments in which an embodiment of the present invention combining natural language feedback with visual attribute information results in superior user feedback modeling and retrieval performance relative to using either of these modalities alone. Using visual attributes as side information enhances both user feedback modeling through improved relative captioning, and the visual-semantic quality of the image representations utilized by the retriever, which leads to significantly improved retrieval results. Thus, FIGS. 11-14 show that illustrative embodiments of the present invention advantageously improve both user feedback modeling and dialog-based image retrieval.

All of the experiments discussed herein with reference to FIGS. 11-14 were performed on three datasets, respectively comprising Dresses (D), Shirts (S), and Tops&Tees (T). FIG. 10 shows statistics regarding the data used to obtain the experimental results shown in FIGS. 11-14. For each of the three datasets, the total number of images, the number of images with side information, and the number of relative captions is shown. Moreover, each of these figures is also broken down between training, validation, and testing. Further details regarding these experimental datasets may be found in the Guo19 paper at Section 3 and Appendix A. Moreover, all of the experiments used the Adam method for stochastic optimization, with a learning rate schedule that is auto-tuned based on validation set performance. See, e.g., Kingma et al., "Adam: A Method for Stochastic Optimization", 3rd International Conference for Learning Representations (ICLR), May 2015, 13 pages, which is incorporated by reference herein in its entirety for all purposes.

FIG. 11 shows experimental results for an attribute prediction network according to an illustrative embodiment of the invention. The attribute network used to produce these results is generally similar to that discussed above with reference to FIGS. 5 and 6. The attribute network had an image embedding size ($D_x$) of 1024, and binary cross entropy loss and Adam were used with an initial learning rate of 0.001 in training.

In FIG. 11, for each of the three data sets (Dresses, Shirts, and Tops&Tees), the top-3 and top-5 recall scores are provided for each of the five attribute classes, as well as the total for all attribute classes. As discussed above with reference to FIG. 5, the 1000 total attributes comprise 156 texture attributes, 218 fabric attributes, 180 shape attributes, 216 part attributes, and 230 style attributes. For each attribute-specific result, the penultimate layer for size for each attribute group is twice the number of attribute layers for that group (i.e., $2 \times D_a$). Notably, in FIG. 11, the Shirts data set yielded the highest performance, while among the five attribute types, Style contained the largest set of attribute words (230) and also produced the lowest recall score among attribute types.

FIG. 12 shows experimental results for a user simulator according to an illustrative embodiment of the invention. More particularly, FIG. 12 compares various user simulator models using common image captioning metrics, including BLEU (Bilingual Evaluation Understudy), METEOR (Metric for Evaluation of Translation with Explicit ORdering), ROGUE (Recall-Oriented Understudy for Gisting Evaluation), CIDEr (Consensus-based Image Description Evaluation), and SPICE (Semantic Propositional Image Caption Evaluation). For each of the five models tested (1210, 1211, 1212, 1220, and 1230), results are given for each of the three data sets (Dresses, Shirts, and Tops&Tees).

Model 1210 was an attribute-aware user simulator model with attention, and is generally similar to that discussed above with reference to FIG. 9A. To assess the relative importance of the image and attribute components, each of the components was removed from the inputs of the attribute aware attention model 1210. Model 1211 shows the minimum performance for model 1210 when removing one of the five attributes types. Model 1212 shows the performance for model 1210 when the image component is removed.

In order to assess the efficiency of the attention mechanism in combining image and attribute features, model 1220 is an attribute-aware model that utilizes the attribute features by simply concatenating them to the image features, and is generally similar to that discussed above with reference to FIG. 9B. In order to empirically evaluate the effect on the user simulator of augmenting the image representation with attribute features, model 1230 is a baseline model with access to only images, and is generally similar to that discussed above with reference to FIG. 9C.

The word embedding dimension and the decoder LSTM configuration were the same for all models. Specifically, the word embedding size was 512-D, the decoder LSTM hidden state was 512-D and the input dimension was 1024-D. For the image-only model 1230 and the attribute-aware concatenation captioning model 1220, the image embedding was 1024-D. The attribute-aware concatenation captioning model 1220 linearly projected the concatenated attribute and image features to 1024-D. For attribute-aware attention captioning models 1210, 1211, and 1212, the image embedding was 512-D, and the projected attribute vectors were also 512-D. After concatenation with the word embedding, the input to the decoder LSTM was thus 1024-D, which is consistent with the other two models 1220 and 1230.

Model 1210 had the highest scores for each of the three datasets under every one of the eight metrics. The performance degeneration of removing the image component 1212 is more significant than removing any attribute component 1211, indicating that the image component still plays the most prominent role in the relative captioning systems. The attribute-aware methods using attention 1210 and using concatenation 1220 outperformed the image-only baseline 1230 across all metrics, suggesting that attribute prediction improves relative captioning performance. The attention-enabled attribute-aware captioner 1210 scores significantly higher than the concatenation-based model 1220, suggesting that the attention mechanism is better able to utilize the attribute prediction information.

Figures 13, 14:
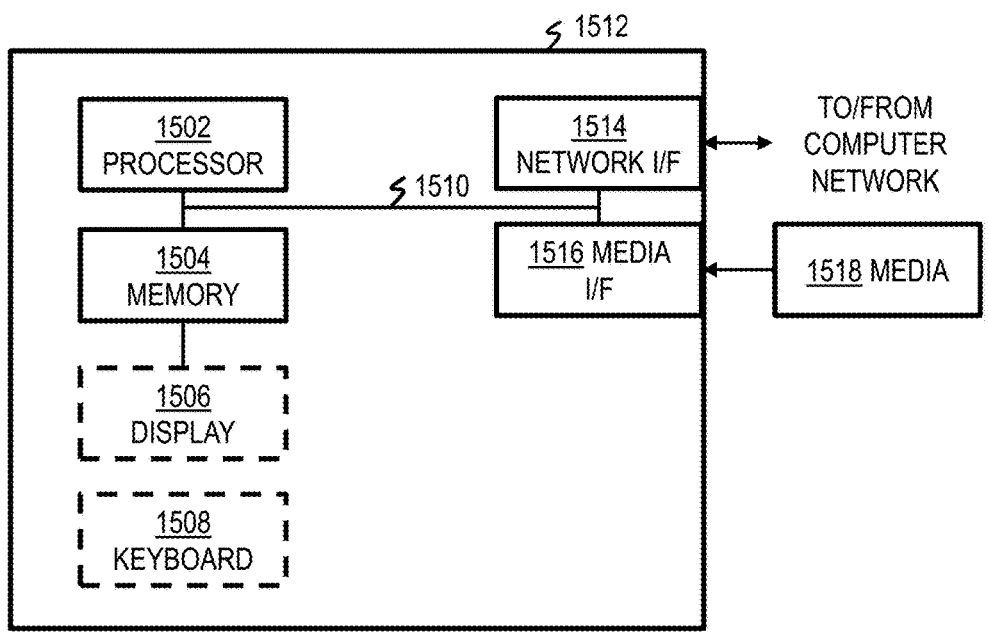
FIG. 13 shows experimental results for interactive image retrieval according to an illustrative embodiment of the invention.
FIG. 14 shows a computer system that may be useful in implementing one or more aspects and/or elements of the invention.

FIG. 13 shows experimental results for interactive image retrieval according to an illustrative embodiment of the invention. Here, three models were tested: an attribute-aware attention enabled model similar to that discussed above with reference to 1210 and FIG. 9A; an attribute-aware model with concatenation of attribute and image features similar to that discussed above with reference to 1220 and FIG. 9B; and an image-only baseline similar to that discussed above with reference to 1230 and FIG. 9C. All of the models were configured similarly: the response encoding ($D_e$) was 512-D; the state tracker GRU hidden state ($D_h$) was 256-D; and the query embedding ($D_q$) was 512-D. For composing text and image features for retrieval, the network embedding was 1024-D.

For each of the three models tested, results are given for each of the three data sets (Dresses, Shirts, and Tops&Tees). Specifically, the image retrieval performance is quantified by the average rank percentile of the image returned by the dialog manager on the test set (P) and the recall of the target image at top-N (R@N) for N=5, N=10, and N=50, at the first, third, and fifth dialog turns. Both the attribute-aware methods (via either attention or concatenation) outperform the image-only baseline, especially on R@N, demonstrating the benefit of leveraging side information and relative feedback jointly for interactive image retrieval. Additionally, the attention-enabled model produced better retrieval results overall, suggesting that more advanced techniques for composing side information, relative feedback and image features could lead to further performance gains. Thus, these results demonstrate the empirical advantage of incorporating the estimated attribute features into dialog-based interactive image retrieval.

One or more embodiments of the invention, or elements thereof, can be implemented, at least in part, in the form of an apparatus including a memory and at least one processor that is coupled to the memory and operative to perform exemplary method steps.

One or more embodiments can make use of software running on a general purpose computer or workstation. With reference to FIG. 14, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1502, memory 1504, and input/output interface such as display 1506 and keyboard 1508 can be interconnected, for example, via bus 1510 as part of a data processing unit 1512. Suitable interconnections, for example via bus 1510, can also be provided to a network interface 1514, such as a network card, which can be provided to interface with a computer network, and to a media interface 1516, such as a diskette or CD-ROM drive, which can be provided to interface with media 1518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1502 coupled directly or indirectly to memory elements 1504 through a system bus 1510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1512 as shown in FIG. 14) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1502. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method for improved interactive image search, the method comprising:
    receiving initial input from a client at least partially specifying one or more characteristics, wherein the initial input includes a seed image and a natural language statement describing a desired change to the seed image;
predicting one or more attributes of the seed image by operation of a neural network on the seed image;
parsing the natural language statement to identify desired changes to the one or more attributes of the seed image;
generating an interim target image by changing the one or more attributes of the seed image, according to the parsed natural language statement;
selecting a first set of images from an image database for output to the client, each of said first set of images being determined to at least partially satisfy the one or more changed attributes of the seed image;
displaying the first set of images to the client;
receiving from the client, responsive to the first set of images, a given input of which at least a portion compares a target image to at least a given image within the first set of images;
determining an image feature and a set of attribute features for the given image;
encoding, using a recurrent neural network (RNN), the given input to determine a feedback representation;
determining a joint visual semantic representation by combining the image feature and the set of attribute features for the given image with the feedback representation;
producing a query vector by aggregating the joint visual semantic representation with prior inputs received from the client; and
selecting a second set of images from the image database based at least in part on distances between the query vector and respective feature representations of images from the image database.

2. The method of claim 1, further comprising:
receiving additional inputs from the client relative to the first set of images;
wherein each additional input received from the client comprises textual or audible natural language feedback.

3. The method of claim 2, further comprising:
specifying each additional input as one or more characteristics by reference to one or more images of the first set of images to which the additional input is responsive.

4. The method of claim 1, further comprising:
parsing side information for the given image, which comprises multimodal contextual information regarding the given image.

5. The method of claim 4, wherein parsing the side information comprises extracting a label for at least one attribute of at least one object shown in the given image.

6. The method of claim 4, wherein parsing the side information comprises extracting information not shown in the given image regarding at least one object shown in the given image.

7. The method of claim 6, wherein parsing the side information comprises extracting text describing the at least one object on a webpage displaying at least the given image.

8. The method of claim 7, wherein parsing the side information comprises extracting at least one of a price and an availability for purchase of the at least one object shown in the given image.

9. The method of claim 1, further comprising repeating the method until an end condition occurs;
wherein the end condition occurs when the input received from the client indicates that the first set of images sufficiently satisfies the one or more characteristics.

10. The method of claim 1, wherein the client comprises an interface to a human user, further comprising:
presenting a given output to the human user via the client; and
receiving the given input from the human user via the client.

11. The method of claim 1, wherein the client comprises a user simulation model, further comprising:
generating a responsive input by processing a given output by the user simulation model.

12. The method of claim 11, further comprising:
implementing the user simulation model as an attribute-aware user simulation model.

13. The method of claim 12, further comprising:
implementing the user simulation model as an attribute-aware attentional user simulation model.

14. The method of claim 1, wherein the determining the image feature and the set of attribute features for the given image is performed at least in part using at least one of a residual network (ResNet) and an attribute prediction model.

15. The method of claim 14, wherein the
feedback representation is determined using a gated recurrent unit (GRU); and
the query vector is produced using a long short-term memory (LSTM).

16. The method of claim 14, wherein determining the joint visual semantic representation comprises:
obtaining an attribute-aware visual representation based on a weighted sum of the image feature and each of the set of attribute features; and
computing the joint visual semantic representation by combining the attribute-aware visual representation and the feedback representation with a rectified linear unit (ReLU).

17. The method of claim 1, wherein the determining the image feature and the set of attribute features for the given image is performed at least part using an attribute prediction model, the attribute prediction model comprising a multi-column network with shared lower layers comprising a pre-training residual network (ResNet) with a last fully-connected layer replaced by a trainable linear projection followed by a rectified linear unit (ReLU).

18. An apparatus for improved interactive image search, the apparatus comprising:
a memory; and
at least one processor coupled to the memory, the processor being operative to implement a method comprising:
receiving initial input from a client at least partially specifying one or more characteristics, wherein the initial input includes a seed image and a natural language statement describing a desired change to the seed image;
predicting one or more attributes of the seed image by operation of a neural network on the seed image;
parsing the natural language statement to identify desired changes to the one or more attributes of the seed image;
generating an interim target image by changing the one or more attributes of the seed image, according to the parsed natural language statement;
selecting a first set of images from an image database for output to the client, each of said first set of images being determined to at least partially satisfy the one or more changed attributes of the seed image;
displaying the first set of images to the client;

receiving from the client, responsive to the first set of images, a given input of which at least a portion compares a target image to at least a given image within the first set of images;

determining an image feature and a set of attribute features for the given image;

encoding, using a recurrent neural network (RNN), the given input to determine a feedback representation;

determining a joint visual semantic representation by combining the image feature and the set of attribute features for the given image with the feedback representation;

producing a query vector by aggregating the joint visual semantic representation with prior inputs received from the client; and selecting a second set of images from the image database based at least in part on distances between the query vector and respective feature representations of images from the image database.

19. A computer program product comprising one or more computer readable storage media that embody computer executable instructions, which when executed by a computer cause the computer to perform a method comprising:

receiving initial input from a client at least partially specifying one or more characteristics, wherein the initial input includes a seed image and a natural language statement describing a desired change to the seed image;

predicting one or more attributes of the seed image by operation of a neural network on the seed image;

parsing the natural language statement to identify desired changes to the one or more attributes of the seed image;

generating an interim target image by changing the one or more attributes of the seed image, according to the parsed natural language statement;

selecting a first set of images from an image database for output to the client, each of said first set of images being determined to at least partially satisfy the one or more changed attributes of the seed image;

displaying the first set of images to the client;

receiving from the client, responsive to the first set of images, a given input of which at least a portion compares a target image to at least a given image within the first set of images;

determining an image feature and a set of attribute features for the given image;

encoding, using a recurrent neural network (RNN), the given input to determine a feedback representation;

determining a joint visual semantic representation by combining the image feature and the set of attribute features for the given image with the feedback representation;

producing a query vector by aggregating the joint visual semantic representation with prior inputs received from the client; and selecting a second set of images from the image database based at least in part on distances between the query vector and respective feature representations of images from the image database.

\* \* \* \* \*